United States Patent
Fahim et al.

(10) Patent No.: US 12,535,549 B2
(45) Date of Patent: Jan. 27, 2026

(54) USER EQUIPMENT (UE) ASSISTED BACKSCATTER-BASED POSITIONING PROCEDURE

(71) Applicant: QUALCOMM Incorporated, San Diego, CA (US)

(72) Inventors: Mohammad Tarek Fahim, San Diego, CA (US); Srinivas Yerramalli, San Diego, CA (US); Piyush Gupta, Bridgewater, NJ (US); Xiaojie Wang, Hillsborough, NJ (US); Xiaoxia Zhang, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 18/059,030

(22) Filed: Nov. 28, 2022

(65) Prior Publication Data

US 2024/0175966 A1  May 30, 2024

(51) Int. Cl.
| | | |
|---|---|---|
| *G01S 5/00* | (2006.01) | |
| *H04L 5/00* | (2006.01) | |
| *H04W 24/10* | (2009.01) | |
| *H04W 64/00* | (2009.01) | |

(52) U.S. Cl.
CPC .......... *G01S 5/0072* (2013.01); *H04L 5/0051* (2013.01); *H04W 24/10* (2013.01); *H04W 64/00* (2013.01)

(58) Field of Classification Search
None
See application file for complete search history.

(56) References Cited

U.S. PATENT DOCUMENTS

2024/0080114 A1 *  3/2024  Barbu ................ H04B 7/15528

FOREIGN PATENT DOCUMENTS

| KR | 20230056671 A * | 7/2021 | ............ H04W 64/00 |
|---|---|---|---|
| WO | 2019158187 A1 | 8/2019 | |
| WO | 2022025808 A1 | 2/2022 | |
| WO | 2022199785 A1 | 9/2022 | |
| WO | WO-2022200673 A1 * | 9/2022 | ........... G01S 13/765 |

OTHER PUBLICATIONS

International Search Report and Written Opinion—PCT/US2023/077314—ISA/EPO—Feb. 12, 2024.

* cited by examiner

*Primary Examiner* — Adolf Dsouza
(74) *Attorney, Agent, or Firm* — Muncy, Geissler, Olds & Lowe, P.C.

(57) ABSTRACT

A location server receives measurement reports from one or more receiving radio frequency identification (RFID) stations, the measurement reports being based on a backscattered signal from an RFID device observed at the one or more receiving RFID stations, and the backscattered signal being based on a positioning reference signal transmitted by a user equipment (UE). The location server determines an estimated position of the RFID device based on the measurement reports.

27 Claims, 15 Drawing Sheets

USER EQUIPMENT (UE) ASSISTED BACKSCATTER-BASED POSITIONING PROCEDURE

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a location server includes receiving measurement reports from one or more receiving RFID stations, the measurement reports being based on a backscattered signal from an RFID device observed at the one or more receiving RFID stations, and the backscattered signal being based on a positioning reference signal transmitted by a user equipment (UE); and determining an estimated position of the RFID device based on the measurement reports.

In an aspect, a method of operating a user equipment (UE) includes transmitting a positioning reference signal to a radio frequency identification (RFID) device, the positioning reference signal enabling the RFID device to transmit a backscattered signal based on the positioning reference signal; receiving the backscattered signal from the RFID device and observed at the UE; and transmitting a measurement report of the backscattered signal observed at the UE to a location server.

In an aspect, a location server includes a memory; at least one transceiver; and at least one processor communicatively coupled to the memory and the at least one transceiver, the at least one processor configured to: receive, via the at least one transceiver, measurement reports from one or more receiving RFID stations, the measurement reports being based on a backscattered signal from an RFID device observed at the one or more receiving RFID stations, and the backscattered signal being based on a positioning reference signal transmitted by a user equipment (UE); and determine an estimated position of the RFID device based on the measurement reports.

In an aspect, a user equipment (UE) includes a memory; at least one transceiver; and at least one processor communicatively coupled to the memory and the at least one transceiver, the at least one processor configured to: transmit, via the at least one transceiver, a positioning reference signal to a radio frequency identification (RFID) device, the positioning reference signal enabling the RFID device to transmit a backscattered signal based on the positioning reference signal; receive, via the at least one transceiver, the backscattered signal from the RFID device and observed at the UE; and transmit, via the at least one transceiver, a measurement report of the backscattered signal observed at the UE to a location server.

In an aspect, a location server includes means for receiving measurement reports from one or more receiving RFID stations, the measurement reports being based on a backscattered signal from an RFID device observed at the one or more receiving RFID stations, and the backscattered signal being based on a positioning reference signal transmitted by a user equipment (UE); and means for determining an estimated position of the RFID device based on the measurement reports.

In an aspect, a user equipment (UE) includes means for transmitting a positioning reference signal to a radio frequency identification (RFID) device, the positioning reference signal enabling the RFID device to transmit a backscattered signal based on the positioning reference signal; means for receiving the backscattered signal from the RFID device and observed at the UE; and means for transmitting a measurement report of the backscattered signal observed at the UE to a location server.

In an aspect, a non-transitory computer-readable medium stores computer-executable instructions that, when executed by a location server, cause the location server to: receive measurement reports from one or more receiving RFID stations, the measurement reports being based on a backscattered signal from an RFID device observed at the one or more receiving RFID stations, and the backscattered signal being based on a positioning reference signal transmitted by a user equipment (UE); and determine an estimated position of the RFID device based on the measurement reports.

In an aspect, a non-transitory computer-readable medium stores computer-executable instructions that, when executed by a user equipment (UE), cause the UE to: transmit a positioning reference signal to a radio frequency identification (RFID) device, the positioning reference signal enabling the RFID device to transmit a backscattered signal based on the positioning reference signal; receive the backscattered signal from the RFID device and observed at the UE; and transmit a measurement report of the backscattered signal observed at the UE to a location server.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
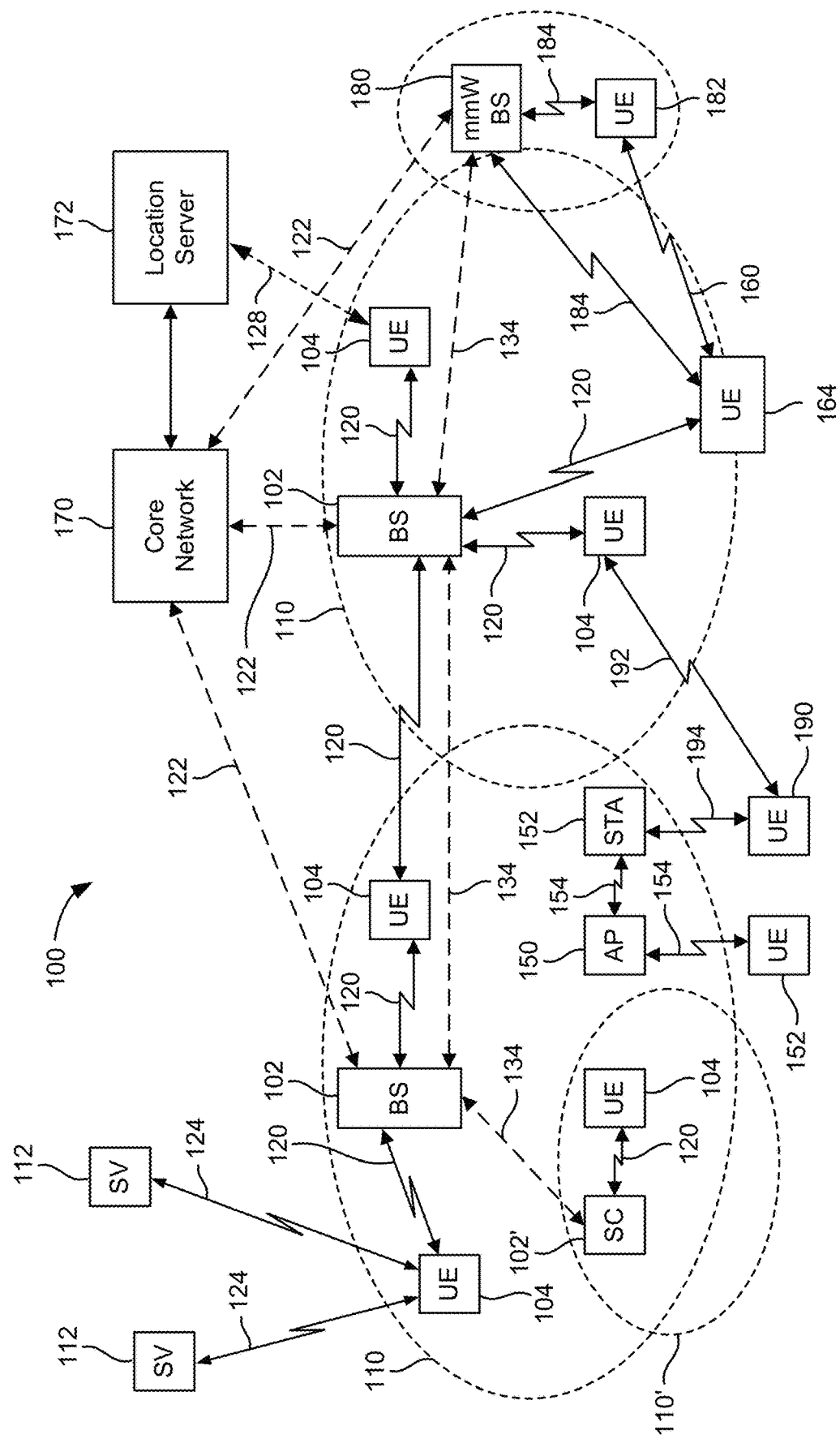
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IOT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IOT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHZ unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHZ, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHZ). It should be understood that although a portion of FR1 is greater than 6 GHZ, FR1 is often referred to (interchangeably) as a "Sub-6 GHZ" band in various documents and articles. A similar nomenclature issue sometimes occurs with regard to FR2, which is often referred to (interchangeably) as a "millimeter wave" band in documents and articles, despite being different from the extremely high frequency (EHF) band (30) GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
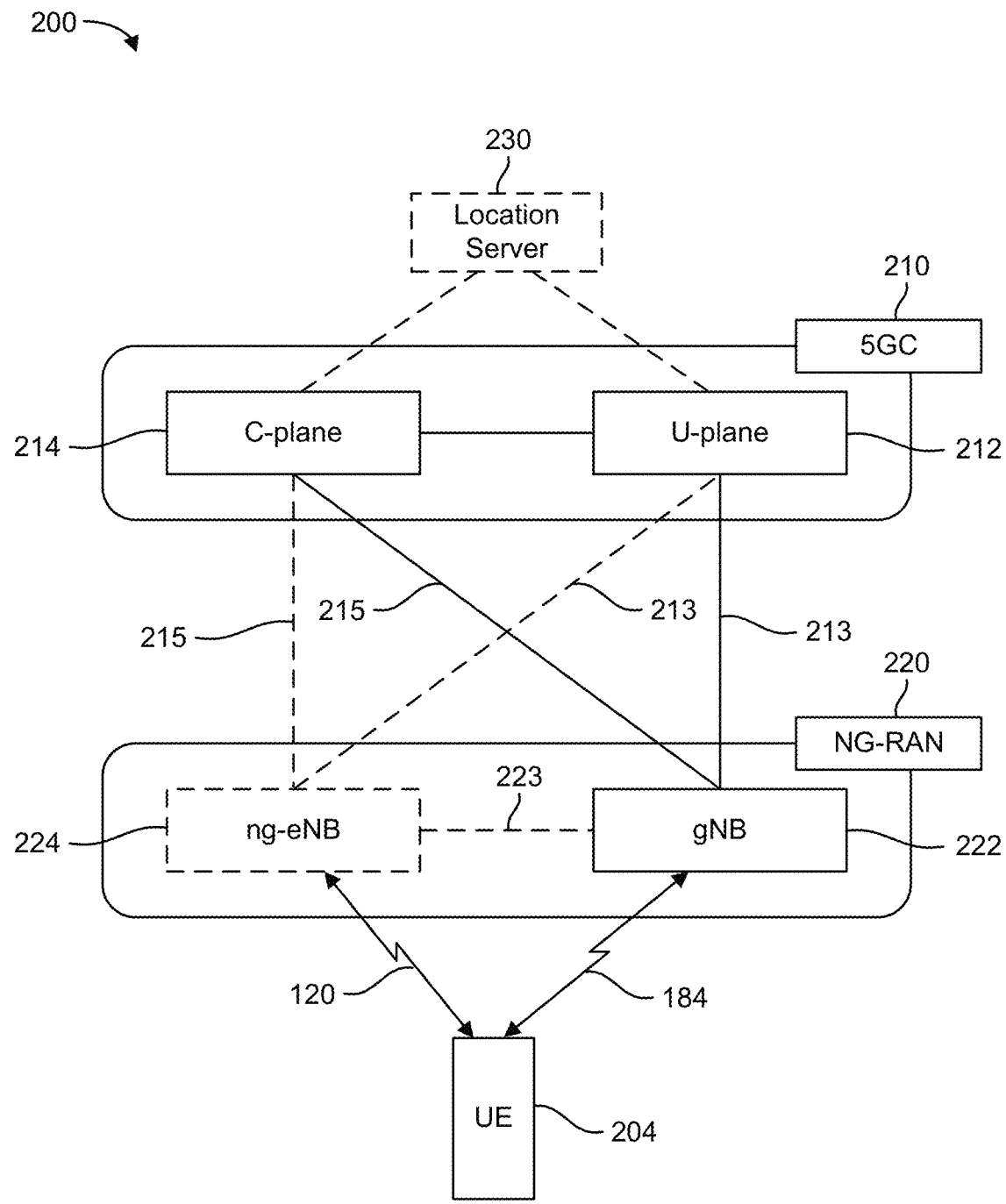
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
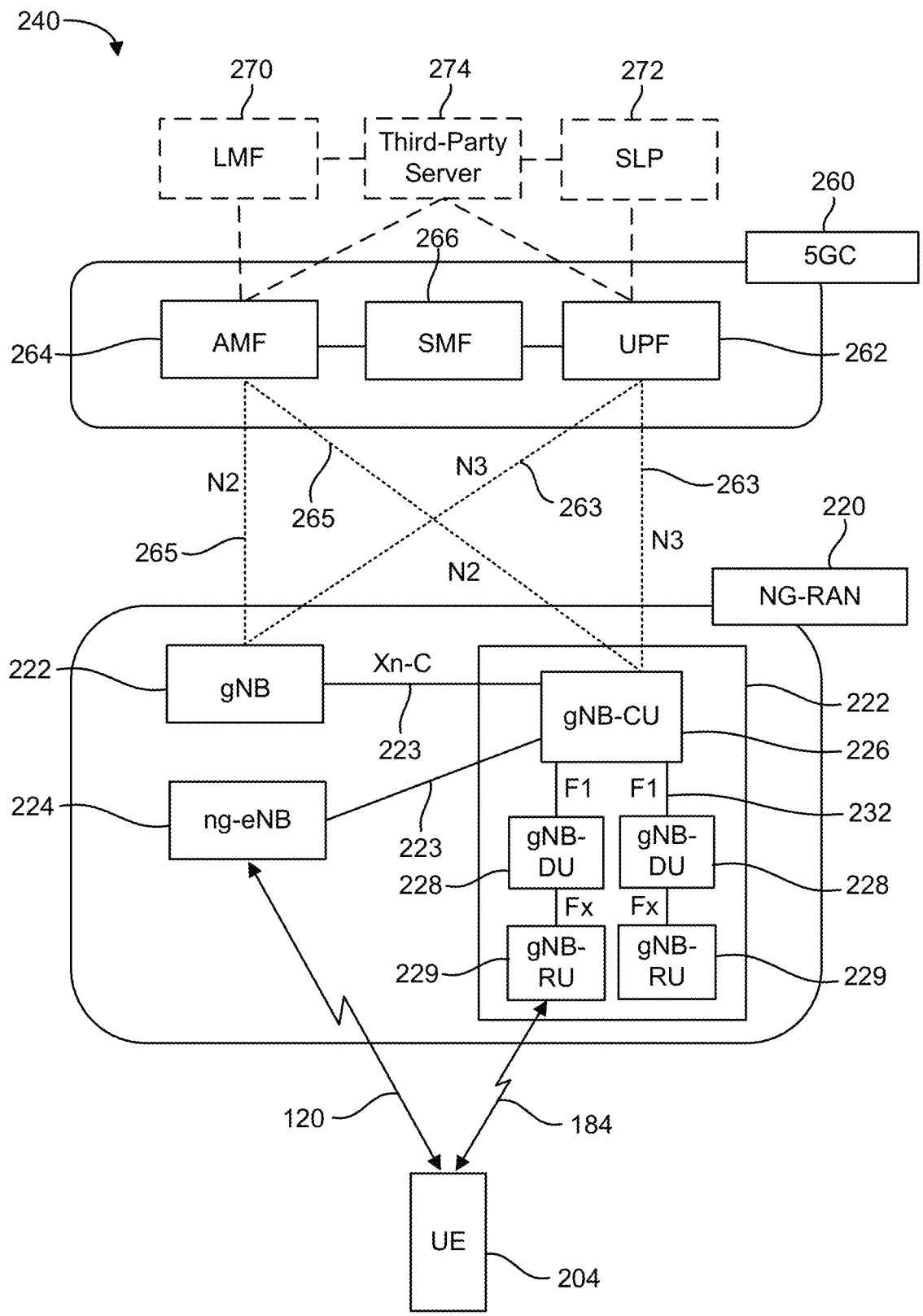

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220) and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
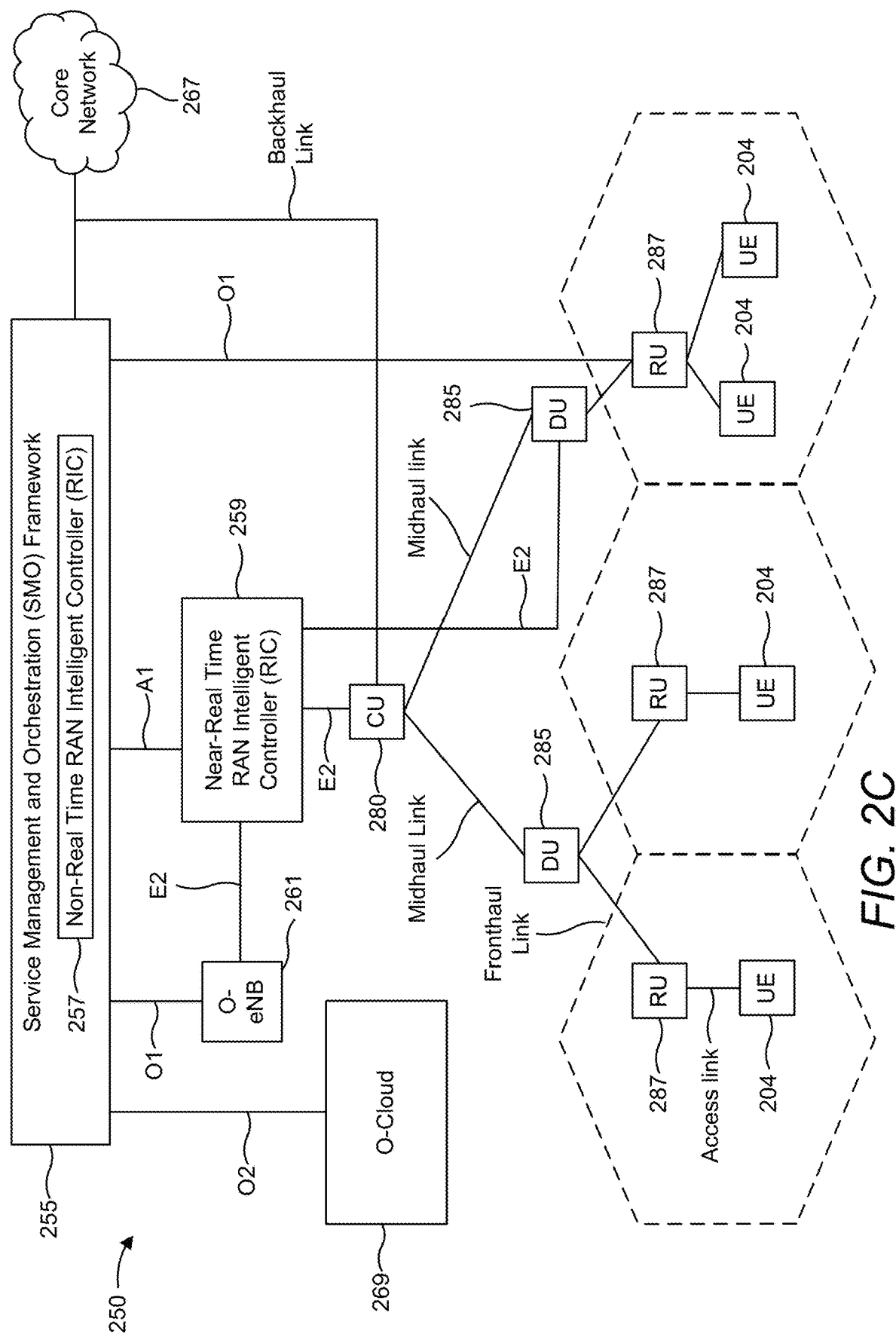

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUS) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUS 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via 01) or via creation of RAN management policies (such as A1 policies).

Moreover, in some aspects, further studies in 3GPP on Passive IoT may include: use cases of interest not captured elsewhere in 3GPP, e.g., identification, tracking, and monitoring; scenarios of interest including public or private network, indoor or outdoor environment, and macro, micro, or pico cells; existing solutions that address the use cases of interest (e.g., Radio Frequency Identification, RFID); determination of feasibility of use cases and scenarios; design targets including link budget, data rate, power consumption, cost, supported energy sources or energy harvesting techniques; and coexistence with UEs and infrastructure in frequency bands for current 3GPP technologies.

In some aspects, an RFID system may be implemented integrally or in parallel (e.g., based on the same devices such as TRPs or UEs or based on the same radio resources) with the communications system 100 described above. In some aspects, a typical RFID system may include RFID stations and RFID devices. In some aspects, an RFID station may be configured to transmit RFID interrogating signals to an RFID device. In some examples, an RFID station may be configured to receive RFID response signals from an RFID tag in response to the RFID interrogating signals. In some aspects, an RFID station that is configured to transmit an interrogating signal and receive a response signal may be referred to as an RF reader; and an RFID device that transmits the response signal may be referred to as an RFID tag.

In some aspects, an RFID system may be used in many ways for locating and identifying objects to which the corresponding RFID devices (or tags) are attached, as well as reading and/or writing information to/from the RFID devices. In some examples, an RFID system may be used in various applications in product-related and service-related industries for tracking objects being processed, inventoried, or handled. In such cases, an RFID device is usually attached to an individual item or to a package.

In some aspects, in operation, an RFID station or an RFID reader may transmit an interrogating signal to interrogate one or more RFID devices. The interrogating signal may be encoded with one or more commands that instruct the RFID devices to perform one or more actions.

In some aspects, an RFID device that senses the interrogating signal may respond by transmitting back a response signal. In many applications, the RFID device may adjust an impedance of its antenna and transmit the response signal by reflecting a portion of the interrogating signal in a process known as backscattering. In some implementations, an RFID device may actively generate and transmit the response signal.

In some aspects, the response signal from the RFID device may include a message that is encoded with data stored in the RFID device, such as a serial number, a price, a date, a time, a destination, an encrypted message, an electronic signature, other attribute(s), any combination of attributes, and so on. The response signal is then received by the RFID station, where the message is demodulated and decoded by the RFID station.

In some aspects, the RFID devices may be categorized into three types of devices based on their capabilities, including passive RFID devices, semi-passive RFID devices, and active RFID devices.

In some aspects, a passive RFID device may have no power source and may transmit the response signal by backscattering. In some aspects, a passive RFID device may harvest electrical energy from ambient signals to power up. In some aspects, a passive RFID device may have a limited computational capability and may not have the ability for advanced signal processing or operations (e.g., analog-to-digital conversion or digital-to-analog conversion). In some aspects, a semi-passive RFID device may have its own power source and may still transmit the response signal by backscattering. In some aspects, a semi-passive RFID device may have an on-board limited power source that can be used to energize a microchip thereon.

In some aspects, an active RFID device may have an on-board power source, and may generate and transmit the response signal by active transmission powered by the on-board power source. In some aspects, an active RFID device may transmit the response signal to an RFID station regardless of whether the RFID device is within a coverage range of the RFID station.

Figure 3:
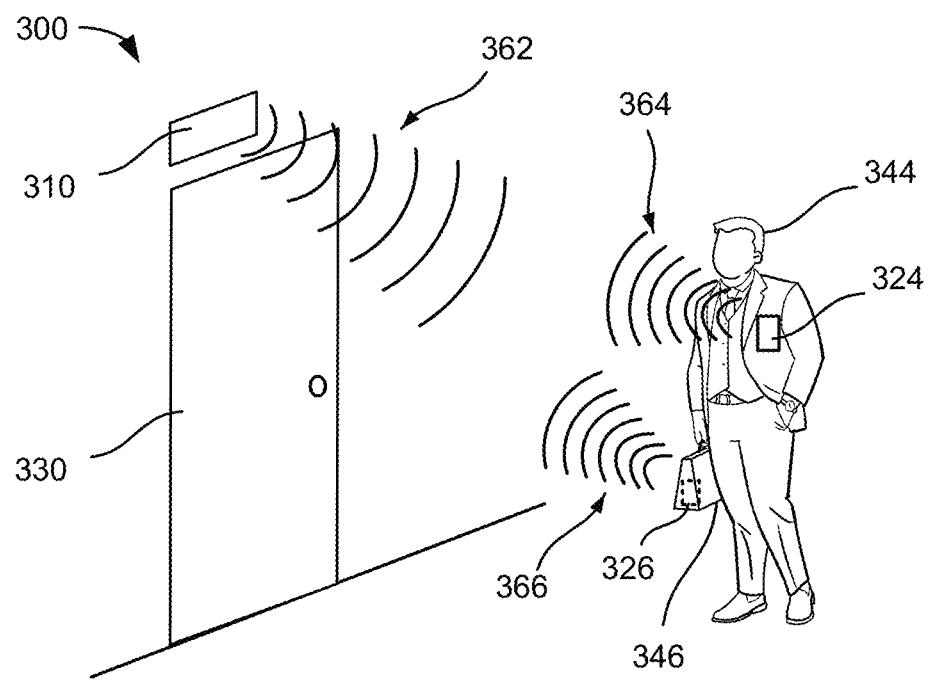
FIG. 3 illustrates an example Radio Frequency Identification (RFID) system, according to aspects of the disclosure.

FIG. 3 illustrates an example RFID system 300, according to aspects of the disclosure. In some aspects, the RFID system 300 includes an RFID station 310 configured as an RFID reader and RFID devices (e.g., tags) 324 and 326. In this example, the RFID station 310 is for controlling the access to the door 330.

As shown in FIG. 3, a person 344 (e.g., an employee) carrying an asset 346 (e.g., a suitcase) may want to access the door 330. The person 344 may carry the RFID device 324 (e.g., embedded in an RFID enabled access card), and the asset 346 may have the RFID device 326 (e.g., an RFID asset tag) attached thereon. To identify the person 344 or the asset 346 in order to grant or deny the access to the door 330, the RFID station 310 may transmit an interrogating signal 362. In response to the interrogating signal 362, the RFID device 324 may transmit a backscattered response signal 364, and the RFID device 326 may transmit a backscattered response signal 366. The backscattered response signal 364 may be modulated with data stored in the RFID device 324 in response to a command encoded in the interrogating signal 362. Also, the backscattered response signal 366 may be modulated with data stored in the RFID device 326 in response to the command encoded in the interrogating signal 362. The RFID station 310 may receive and decode the backscattered response signals 364 and 366 in order to obtain the response provided by the RFID devices 324 and 326.

FIG. 3 shows a possible application of an RFID system. In some aspects, applications of the RFID technology may include automated checkout, monitoring medication intakes for elderlies, vehicle ignition keys, employee attendance system, positioning objects, or tracking objects. In some aspects, the RFID devices may be attached to, embedded in, or integrally formed with a target or an object, including a wireless communications device, a shipping container, a merchandise, an identification card, a payment card, an automobile, or a pet.

In some aspects, the RFID station 310 may be configured to communicate with the RFID devices 324 and 326 over an air interface based on one or more RFID standards or wireless communications standards, such as those set by the International Organization for Standardization (ISO), the International Electrotechnical Commission (IEC), American Society for Testing and Materials (ASTM) International, the DASH7 Alliance, Electronic Product Code Global (EPCglobal), and/or 3GPP standards for Passive IoT. In some examples, based on the frequency band of the air interface, the RFID technology may be referred to as Low Frequency (LF) RFID (e.g., from 30 kHz to 300 kHz), High Frequency (HF) RFID (e.g., from 3 MHz to 30 MHZ), or Ultra High Frequency (UHF) RFID (e.g., from 300 MHz to 3 GHZ).

In some aspects, an RFID system may be implemented integrally or in parallel with a wireless communications system (e.g., the LTE or 5G NR as described above), and the RFID interrogating signals may be transmitted over a radio resource of the wireless communications system.

Figure 4A:
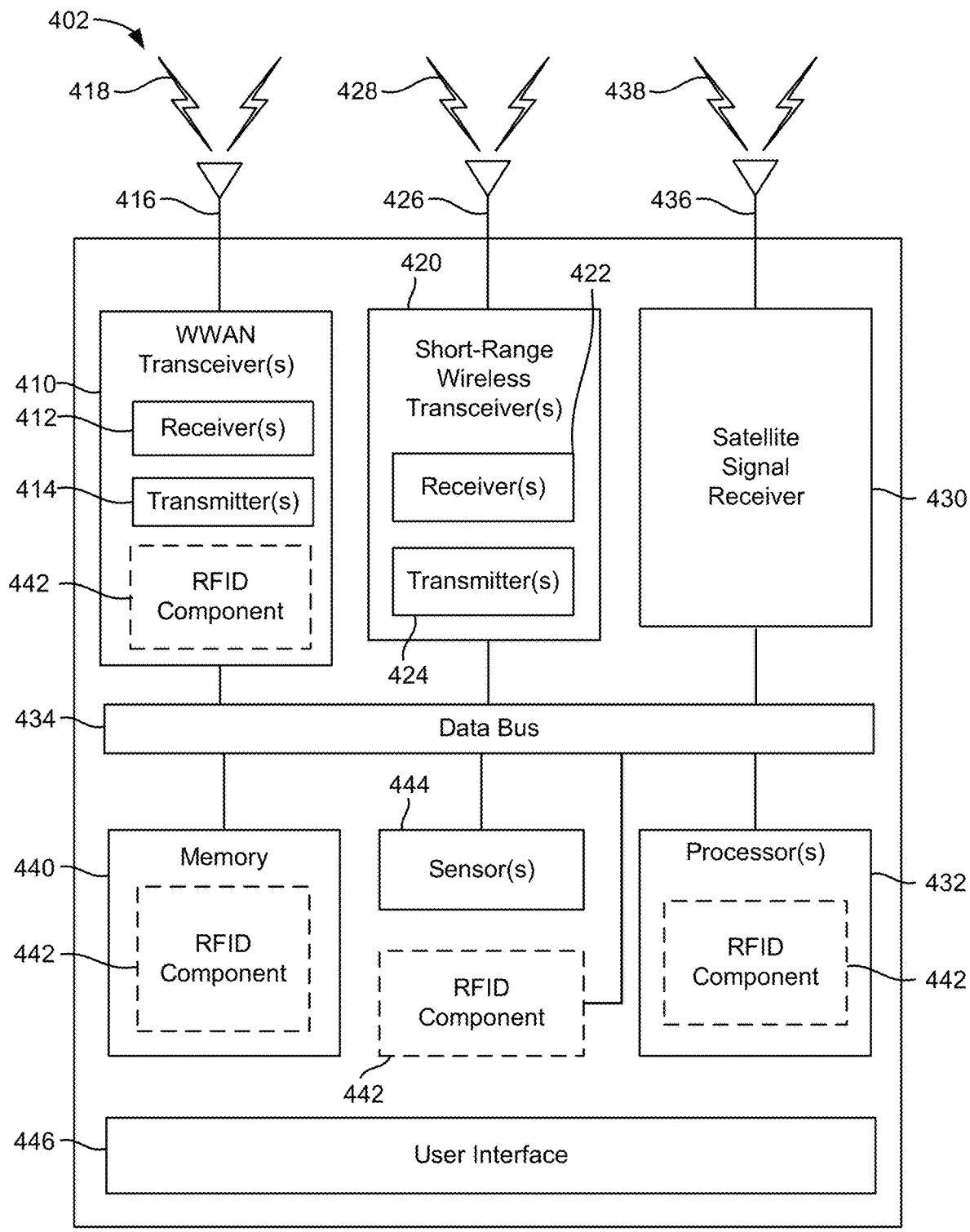
FIGS. 4A, 4B, and 4C are simplified block diagrams of several sample aspects of components that may be employed in a user equipment (UE), a base station, and a network entity, respectively, and configured to support communications as taught herein.
Figure 4B:
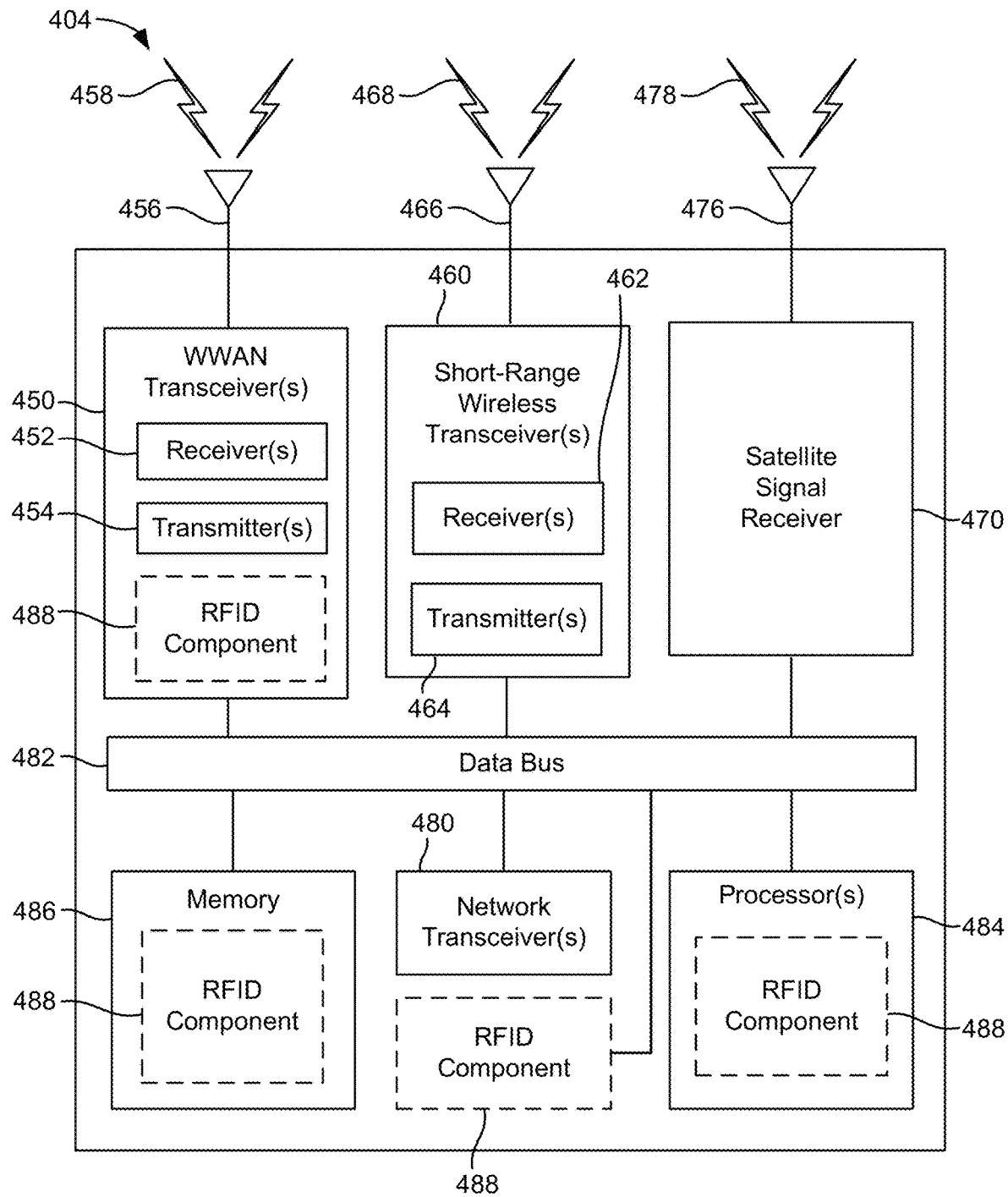
Figure 4C:
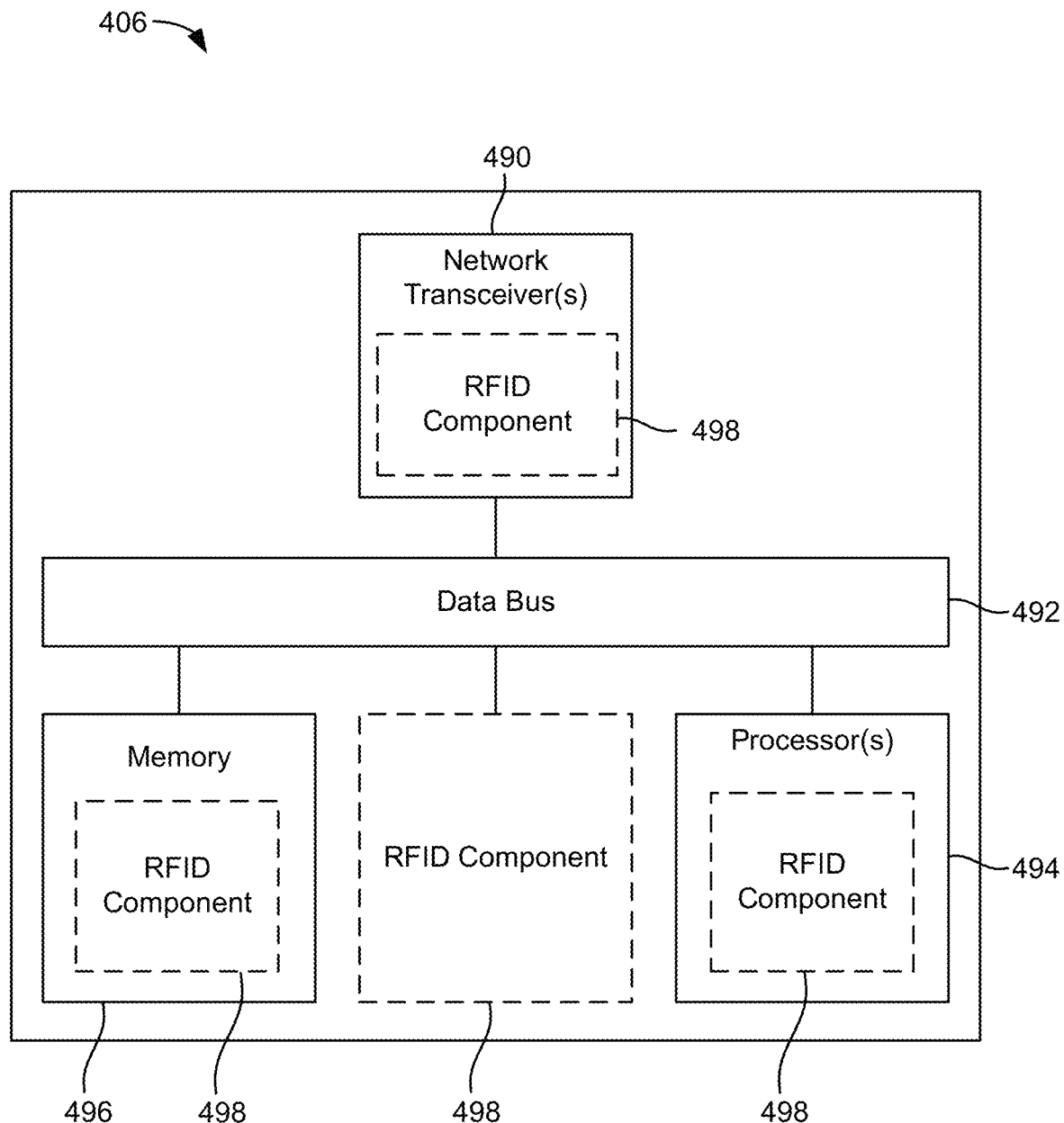

FIGS. 4A, 4B, and 4C illustrate several example components (represented by corresponding blocks) that may be incorporated into a UE 402 (which may correspond to any of the UEs described herein), a base station 404 (which may correspond to any of the base stations described herein), and a network entity 406 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 402 and the base station 404 each include one or more wireless wide area network (WWAN) transceivers 410 and 450, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 410 and 450 may each be connected to one or more antennas 416 and 456, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 410 and 450 may be variously configured for transmitting and encoding signals 418 and 458 (e.g., messages, indications, information, and so on), respectively, and, conversely, for receiving and decoding signals 418 and 458 (e.g., messages, indications, information, pilots, and so on), respectively, in accordance with the designated RAT. Specifically, the WWAN transceivers 410 and 450 include one or more transmitters 414 and 454, respectively, for transmitting and encoding signals 418 and 458, respectively, and one or more receivers 412 and 452, respectively, for receiving and decoding signals 418 and 458, respectively.

The UE 402 and the base station 404 each also include, at least in some cases, one or more short-range wireless transceivers 420 and 460, respectively. The short-range wireless transceivers 420 and 460 may be connected to one or more antennas 426 and 466, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 420 and 460 may be variously configured for transmitting and encoding signals 428 and 468 (e.g., messages, indications, information, and so on), respectively, and, conversely, for receiving and decoding signals 428 and 468 (e.g., messages, indications, information, pilots, and so on), respectively, in accordance with the designated RAT. Specifically, the short-range wireless transceivers 420 and 460 include one or more transmitters 424 and 464, respectively, for transmitting and encoding signals 428 and 468, respectively, and one or more receivers 422 and 462, respectively, for receiving and decoding signals 428 and 468, respectively. As specific examples, the short-range wireless transceivers 420 and 460 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 402 and the base station 404 also include, at least in some cases, satellite signal receivers 430 and 470. The satellite signal receivers 430 and 470 may be connected to one or more antennas 436 and 476, respectively, and may provide means for receiving and/or measuring satellite positioning/communication signals 438 and 478, respectively. Where the satellite signal receivers 430 and 470 are satellite positioning system receivers, the satellite positioning/communication signals 438 and 478 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 430 and 470 are non-terrestrial network (NTN) receivers, the satellite positioning/communication signals 438 and 478 may be communication signals (e.g., carrying control and/or user data) originating from a 5G network. The satellite signal receivers 430 and 470 may comprise any suitable hardware and/or software for receiving and processing satellite positioning/communication signals 438 and 478, respectively. The satellite signal receivers 430 and 470 may request information and operations as appropriate from the other systems, and, at least in some cases, perform calculations to determine locations of the UE 402 and the base station 404, respectively, using measurements obtained by any suitable satellite positioning system algorithm.

The base station 404 and the network entity 406 each include one or more network transceivers 480 and 490, respectively, providing means for communicating (e.g., means for transmitting, means for receiving, etc.) with other network entities (e.g., other base stations 404, other network entities 406). For example, the base station 404 may employ the one or more network transceivers 480 to communicate with other base stations 404 or network entities 406 over one or more wired or wireless backhaul links. As another example, the network entity 406 may employ the one or more network transceivers 490 to communicate with one or more base station 404 over one or more wired or wireless backhaul links, or with other network entities 406 over one or more wired or wireless core network interfaces.

A transceiver may be configured to communicate over a wired or wireless link. A transceiver (whether a wired transceiver or a wireless transceiver) includes transmitter circuitry (e.g., transmitters 414, 424, 454, 464) and receiver circuitry (e.g., receivers 412, 422, 452, 462). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 480 and 490 in some implementations) may be coupled to one or more wired network interface ports. Wireless transmitter circuitry (e.g., transmitters 414, 424, 454, 464) may include or be coupled to a plurality of antennas (e.g., antennas 416, 426, 456, 466), such as an antenna array, that permits the respective apparatus (e.g., UE 402, base station 404) to perform transmit "beamforming," as described herein. Similarly, wireless receiver circuitry (e.g., receivers 412, 422, 452, 462) may include or be coupled to a plurality of antennas (e.g., antennas 416, 426, 456, 466), such as an antenna array, that permits the respective apparatus (e.g., UE 402, base station 404) to perform receive beamforming, as described herein. In an aspect, the transmitter circuitry and receiver circuitry may share the same plurality of antennas (e.g., antennas 416, 426, 456, 466), such that the respective apparatus can only receive or transmit at a given time, not both at the same time. A wireless transceiver (e.g., WWAN transceivers 410 and 450, short-range wireless transceivers 420 and 460) may also include a network listen module (NLM) or the like for performing various measurements.

As used herein, the various wireless transceivers (e.g., transceivers 410, 420, 450, and 460, and network transceivers 480 and 490 in some implementations) and wired transceivers (e.g., network transceivers 480 and 490 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 402) and a base station (e.g., base station 404) will generally relate to signaling via a wireless transceiver.

The UE 402, the base station 404, and the network entity 406 also include other components that may be used in conjunction with the operations as disclosed herein. The UE 402, the base station 404, and the network entity 406 include one or more processors 432, 484, and 494, respectively, for providing functionality relating to, for example, wireless communication, and for providing other processing functionality. The processors 432, 484, and 494 may therefore provide means for processing, such as means for determining, means for calculating, means for receiving, means for transmitting, means for indicating, etc. In an aspect, the processors 432, 484, and 494 may include, for example, one or more general purpose processors, multi-core processors, central processing units (CPUs), ASICs, digital signal processors (DSPs), field programmable gate array's (FPGAs), other programmable logic devices or processing circuitry, or various combinations thereof.

The UE 402, the base station 404, and the network entity 406 include memory circuitry implementing memories 440, 486, and 496 (e.g., each including a memory device), respectively, for maintaining information (e.g., information indicative of reserved resources, thresholds, parameters, and so on). The memories 440, 486, and 496 may therefore provide means for storing, means for retrieving, means for maintaining, etc. In some cases, the UE 402, the base station 404, and the network entity 406 may include RFID component 442, 488, and 498, respectively. The RFID component 442, 488, and 498 may be hardware circuits that are part of or coupled to the processors 432, 484, and 494, respectively, that, when executed, cause the UE 402, the base station 404, and the network entity 406 to perform the functionality described herein. In other aspects, the RFID component 442, 488, and 498 may be external to the processors 432, 484, and 494 (e.g., part of a modem processing system, integrated with another processing system, etc.). Alternatively, the RFID component 442, 488, and 498 may be memory modules stored in the memories 440, 486, and 496, respectively, that, when executed by the processors 432, 484, and 494 (or a modem processing system, another processing system, etc.), cause the UE 402, the base station 404, and the network entity 406 to perform the functionality described herein. FIG. 4A illustrates possible locations of the RFID component 442, which may be, for example, part of the one or more WWAN transceivers 410, the memory 440, the one or more processors 432, or any combination thereof, or may be a standalone component. FIG. 4B illustrates possible locations of the RFID component 488, which may be, for example, part of the one or more WWAN transceivers 450, the memory 486, the one or more processors 484, or any combination thereof, or may be a standalone component. FIG. 4C illustrates possible locations of the RFID component 498, which may be, for example, part of the one or more network transceivers 490, the memory 496, the one or more processors 494, or any combination thereof, or may be a standalone component.

The UE 402 may include one or more sensors 444 coupled to the one or more processors 432 to provide means for sensing or detecting movement and/or orientation information that is independent of motion data derived from signals received by the one or more WWAN transceivers 410, the one or more short-range wireless transceivers 420, and/or the satellite signal receiver 430. By way of example, the sensor(s) 444 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 444 may include a plurality of different types of devices and combine their outputs in order to provide motion information. For example, the sensor(s) 444 may use a combination of a multi-axis accelerometer and orientation sensors to provide the ability to compute positions in two-dimensional (2D) and/or three-dimensional (3D) coordinate systems.

In addition, the UE 402 includes a user interface 446 providing means for providing indications (e.g., audible and/or visual indications) to a user and/or for receiving user input (e.g., upon user actuation of a sensing device such a keypad, a touch screen, a microphone, and so on). Although not shown, the base station 404 and the network entity 406 may also include user interfaces.

Referring to the one or more processors 484 in more detail, in the downlink, IP packets from the network entity 406 may be provided to the processor 484. The one or more processors 484 may implement functionality for an RRC layer, a packet data convergence protocol (PDCP) layer, a radio link control (RLC) layer, and a medium access control (MAC) layer. The one or more processors 484 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated 1 with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 454 and the receiver 452 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 454 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 402. Each spatial stream may then be provided to one or more different antennas 456. The transmitter 454 may modulate an RF carrier with a respective spatial stream for transmission.

At the UE 402, the receiver 412 receives a signal through its respective antenna(s) 416. The receiver 412 recovers information modulated onto an RF carrier and provides the information to the one or more processors 432. The transmitter 414 and the receiver 412 implement Layer-1 functionality associated with various signal processing functions. The receiver 412 may perform spatial processing on the information to recover any spatial streams destined for the UE 402. If multiple spatial streams are destined for the UE 402, they may be combined by the receiver 412 into a single OFDM symbol stream. The receiver 412 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 404. These soft decisions may be based on channel estimates computed by a channel estimator. The soft decisions are then decoded and de-interleaved to recover the data and control signals that were originally transmitted by the base station 404 on the physical channel. The data and control signals are then provided to the one or more processors 432, which implements Layer-3 (L3) and Layer-2 (L2) functionality.

In the downlink, the one or more processors 432 provides demultiplexing between transport and logical channels, packet reassembly, deciphering, header decompression, and control signal processing to recover IP packets from the core network. The one or more processors 432 are also responsible for error detection.

Similar to the functionality described in connection with the downlink transmission by the base station 404, the one or more processors 432 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 404 may be used by the transmitter 414 to select the appropriate coding and modulation schemes, and to facilitate spatial processing. The spatial streams generated by the transmitter 414 may be provided to different antenna(s) 416. The transmitter 414 may modulate an RF carrier with a respective spatial stream for transmission.

The uplink transmission is processed at the base station 404 in a manner similar to that described in connection with the receiver function at the UE 402. The receiver 452 receives a signal through its respective antenna(s) 456. The receiver 452 recovers information modulated onto an RF carrier and provides the information to the one or more processors 484.

In the uplink, the one or more processors 484 provides demultiplexing between transport and logical channels, packet reassembly, deciphering, header decompression, control signal processing to recover IP packets from the UE 402. IP packets from the one or more processors 484 may be provided to the core network. The one or more processors 484 are also responsible for error detection.

For convenience, the UE 402, the base station 404, and/or the network entity 406 are shown in FIGS. 4A, 4B, and 4C as including various components that may be configured according to the various examples described herein. It will be appreciated, however, that the illustrated components may have different functionality in different designs. In particular, various components in FIGS. 4A to 4C are optional in alternative configurations and the various aspects include configurations that may vary due to design choice, costs, use of the device, or other considerations. For example, in case of FIG. 4A, a particular implementation of UE 402 may omit the WWAN transceiver(s) 410 (e.g., a wearable device or tablet computer or PC or laptop may have Wi-Fi and/or Bluetooth capability without cellular capability), or may omit the short-range wireless transceiver(s) 420 (e.g., cellular-only, etc.), or may omit the satellite signal receiver 430, or may omit the sensor(s) 444, and so on. In another example, in case of FIG. 4B, a particular implementation of the base station 404 may omit the WWAN transceiver(s) 450 (e.g., a Wi-Fi "hotspot" access point without cellular capability), or may omit the short-range wireless transceiver(s) 460 (e.g., cellular-only, etc.), or may omit the satellite signal receiver 470, and so on. For brevity, illustration of the various alternative configurations is not provided herein, but would be readily understandable to one skilled in the art.

The various components of the UE 402, the base station 404, and the network entity 406 may be communicatively coupled to each other over data buses 434, 482, and 492, respectively. In an aspect, the data buses 434, 482, and 492 may form, or be part of, a communication interface of the UE 402, the base station 404, and the network entity 406, respectively. For example, where different logical entities are embodied in the same device (e.g., gNB and location server functionality incorporated into the same base station 404), the data buses 434, 482, and 492 may provide communication between them.

The components of FIGS. 4A, 4B, and 4C may be implemented in various ways. In some implementations, the components of FIGS. 4A, 4B, and 4C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 410 to 446 may be implemented by processor and memory component(s) of the UE 402 (e.g., by execution of appropriate code and/or by appropriate configuration of processor components). Similarly, some or all of the functionality represented by blocks 450 to 488 may be implemented by processor and memory component(s) of the base station 404 (e.g., by execution of appropriate code and/or by appropriate configuration of processor components). Also, some or all of the functionality represented by blocks 490 to 498 may be implemented by processor and memory component(s) of the network entity 406 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 402, base station 404, network entity 406, etc., such as the processors 432, 484, 494, the transceivers 410, 420, 450, and 460, the memories 440, 486, and 496, the RFID component 442, 488, and 498, etc.

In some designs, the network entity 406 may be implemented as a core network component. In other designs, the network entity 406 may be distinct from a network operator or operation of the cellular network infrastructure (e.g., NG RAN 220 and/or 5GC 210/260). For example, the network entity 406 may be a component of a private network that may be configured to communicate with the UE 402 via the base station 404 or independently from the base station 404 (e.g., over a non-cellular communication link, such as WiFi).

Figure 5:
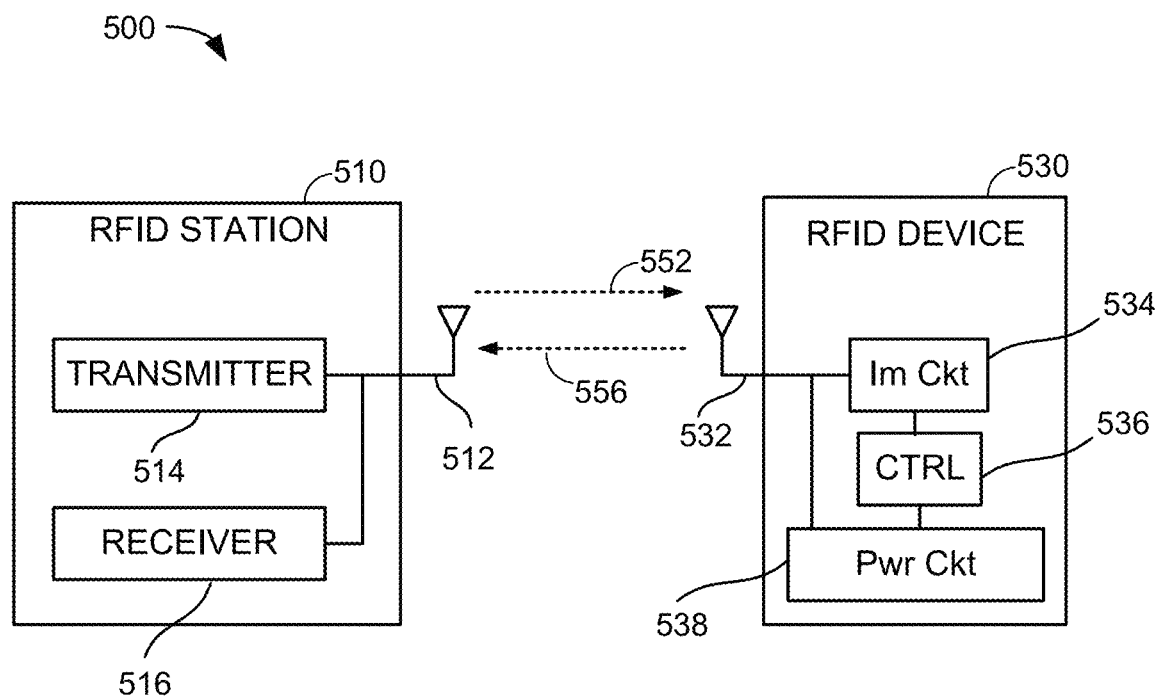
FIG. 5 illustrates a simplified block diagram of an RFID station and an RFID device in an RFID system, according to aspects of the disclosure.

FIG. 5 illustrates a simplified block diagram of an RFID station 510 and an RFID device 530 in an RFID system 500, according to aspects of the disclosure. In some aspects, the RFID station 510 may be an RFID reader and correspond to the RFID station 310 in FIG. 3. In some aspects, the RFID device 550 may correspond to the RFID device 324 or 326 in FIG. 3.

As shown in FIG. 5, the RFID station 510 includes an antenna 512, and a transmitter 514 and a receiver 516 electrically coupled with the antenna 512. Also, the RFID device 530 includes an antenna 532, antenna impedance adjusting circuitry 534 (abbreviated as "Im Ckt" in FIG. 5) configured to adjust an impedance of the antenna 532, a controller 536 (abbreviated as "CTRL" in FIG. 5) configured to control the antenna impedance adjusting circuitry 534, and power circuitry 538 (abbreviated as "Pwr Ckt" in FIG. 5) configured to provide the electrical power to the controller 536 and the antenna impedance adjusting circuitry 534.

In some aspects, a TRP in a wireless communications system may be configured to function as, or to incorporate, the RFID station 510. In such scenario, the RFID station 510 may correspond to the base station 404, the transmitter 514 may correspond to the transmitter 454 and/or the RFID component 488 in the WWAN transceivers 450, or the transmitter 464 in the short-range wireless transceivers 460; the receiver 516 may correspond to the receiver 452 and/or the RFID component 488 in the WWAN transceivers 450, or the receiver 462 in the short-range wireless transceivers 460; and the antenna 512 may correspond to the antenna 456 or the antenna 466. In some aspects, a UE in a wireless communications system may be configured to function as, or to incorporate, the RFID station 510. In such scenario, the RFID station 510 may correspond to the UE 402, the transmitter 514 may correspond to the transmitter 414 and/or the RFID component 442 in the WWAN transceivers 420, or the transmitter 424 in the short-range wireless transceivers 420; the receiver 516 may correspond to the receiver 414 and/or the RFID component 442 in the WWAN transceivers 420, or the receiver 422 in the short-range wireless transceivers 420; and the antenna 512 may correspond to the antenna 416 or the antenna 426.

In some aspects, a UE in a wireless communications system may be configured to function as, or to incorporate, the RFID device 530. In such scenario, the RFID device 530 may correspond to the UE 402, the antenna impedance adjusting circuitry 534, the controller 536, and the power circuitry 538 may correspond to the RFID component 442, and the antenna 532 may correspond to the antenna 416 or the antenna 426.

In some aspects, in operation, the transmitter 514 of the RFID station 510 may transmit an interrogating signal 552 via the antenna 512 to the RFID device 530. In some aspects, the interrogating signal 552 may be embedded with a command from the RFID station 510. The command may provide the RFID device 530 a time frame for responding to the interrogating signal 552, instruct the RFID device 530 to provide its identification code or other information related to the identity or capability of the RFID device 530, or both. The RFID device 530, when being powered on and upon receiving the interrogating signal 552, may cause the controller 536 to prepare a response based on the embedded command and to control the antenna impedance adjusting circuitry 534 to adjust an impedance of the antenna 532 based on the prepared response. The antenna 532 may reflect the interrogating signal 552, and the reflected signal may also be referred to as a backscattered signal 556. As the impedance of the antenna 532 varies, the amplitude and phase of the backscattered signal 556 may vary. Accordingly, the controller 536 may modulate the backscattered signal 556 to carry the response by adjusting the impedance of the antenna 532.

In some aspects, the RFID tag 530 may be a passive RFID tag. In such scenario, the power circuitry 538 may harvest the electrical power from the interrogating signal 552 to power the controller 536 and the antenna impedance adjusting circuitry 534. In some aspects, the RFID tag 530 may be a semi-passive RFID tag. In such scenario, the power circuitry 538 may power the controller 536 and the antenna impedance adjusting circuitry 534 based on the harvested power from the interrogating signal 552 or an on-board battery (not shown) of the RFID device 530. Also, in some examples, the power circuitry 538 may perform the energy harvesting functionality for detecting the presence or absence of the interrogating signal 552.

Moreover, the receiver 516 of the RFID station 510 may receive the backscattered signal 556 from the RFID device 530 via the antenna 512. The RFID station 510 may decode the backscattered signal 556 to obtain the response provided by the RFID device 530. In some aspects, the RFID system 500 may be used to measure a range or estimate a position of the RFID device 530. In such application, the RFID station 510 may also measure a time of arrival (ToA) of the backscattered signal 556 as observed at the RFID station 510.

In some aspects, as the RFID system 500 may be implemented integrally or in parallel with a wireless communications system (e.g., the LTE or 5G NR as described above), the RFID interrogating signal 552 may be transmitted over a radio resource of the wireless communications system. In some aspects, the RFID system 500 may be used to perform a positioning procedure of the RFID device 530 based on the backscattered signal from the RFID device 530) (also referred to as a backscatter-based positioning procedure), where the RFID system 500 may transmit a positioning reference signal as an interrogating signal, or transmit the interrogating signal over a radio resource of the positioning reference signal of a wireless communications system. In some examples, the positioning reference signal may be a downlink positioning reference signal (DL-PRS), a sidelink positioning reference signal (SL-PRS), or a sounding reference signal (SRS).

Figure 6:
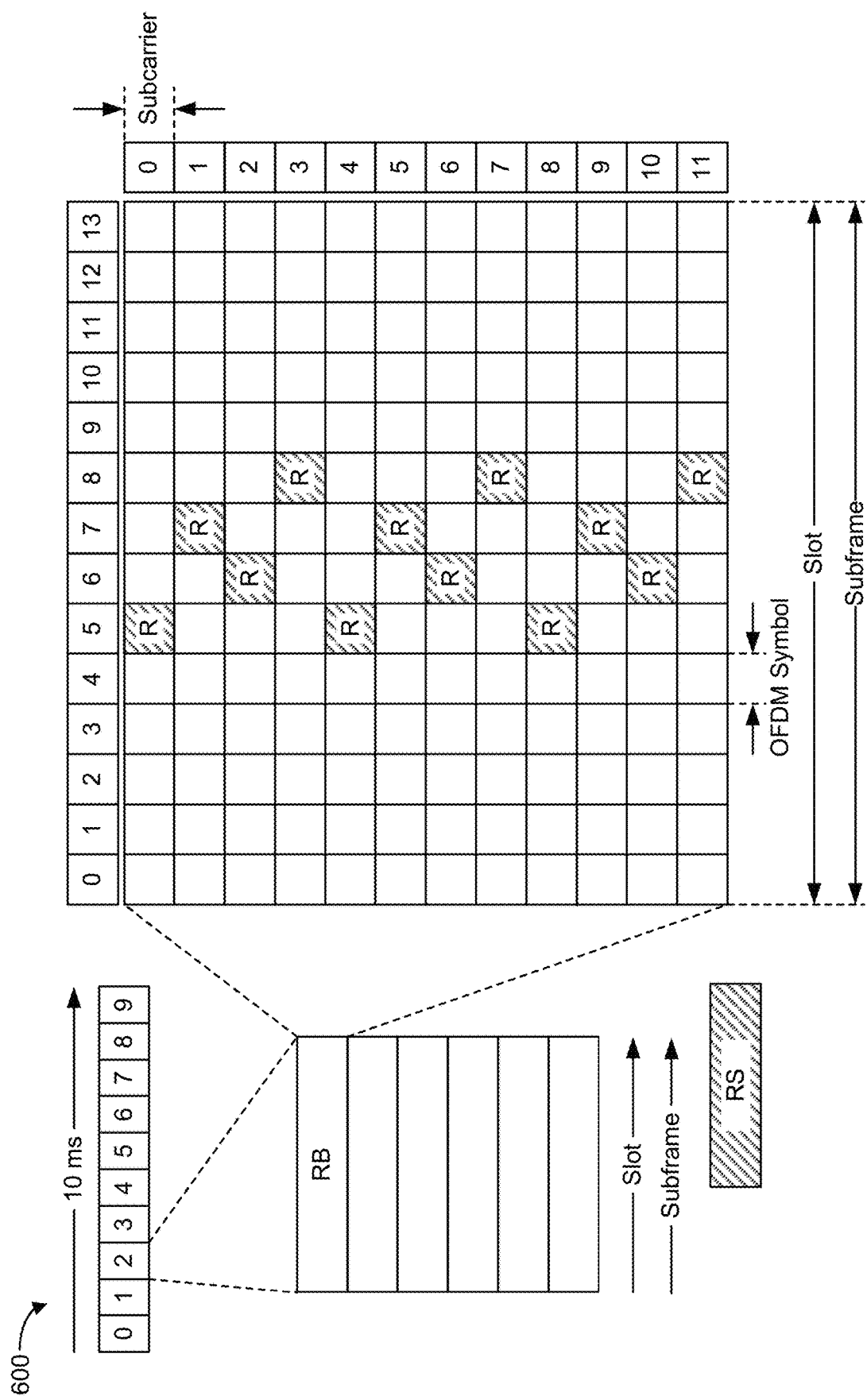
FIG. 6 is a diagram illustrating an example frame structure, according to aspects of the disclosure.

Various frame structures may be used to support downlink and uplink transmissions between network nodes (e.g., base stations and UEs). FIG. 6 is a diagram 600 illustrating an example frame structure, according to aspects of the disclosure. The frame structure may be a downlink or uplink frame structure. Other wireless communications technologies may have different frame structures and/or different channels.

LTE, and in some cases NR, utilizes orthogonal frequency-division multiplexing (OFDM) on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz. (kHz) and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHZ (i.e., 6 resource blocks), and there may be 1, 2, 4, 8, or 16 subbands for system bandwidth of 1.25, 2.5, 5, 10, or 20 MHZ, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 KHZ SCS ($\mu$=0)), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 KHz SCS ($\mu$=2), there are four slots per subframe, 40) slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 KHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 6, a numerology of 15 kHz is used. Thus, in the time domain, a 10 ms frame is divided into 10 equally sized subframes of 1 ms each, and each subframe includes one time slot. In FIG. 6, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 6, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), SRS, etc., depending on whether the illustrated frame structure is used for uplink or downlink communication. FIG. 6 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 6 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 6); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu$*{4, 5, 8, 10, 16, 20, 32, 40, 64, 80, 160, 320, 640, 1280, 2560, 5120, 10240} slots, with u=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink, uplink, or sidelink positioning reference signals, unless otherwise indicated by the context. If needed to further distinguish the type of PRS, a downlink positioning reference signal may be referred to as a "DL-PRS," an uplink positioning reference signal (e.g., an SRS-for-positioning, PTRS) may be referred to as an "UL-PRS," and a sidelink positioning reference signal may be referred to as an "SL-PRS." In addition, for signals that may be transmitted in the downlink, uplink, and/or sidelink (e.g., DMRS), the signals may be prepended with "DL," "UL," or "SL" to distinguish the direction. For example, "UL-DMRS" is different from "DL-DMRS."

Figure 7A:
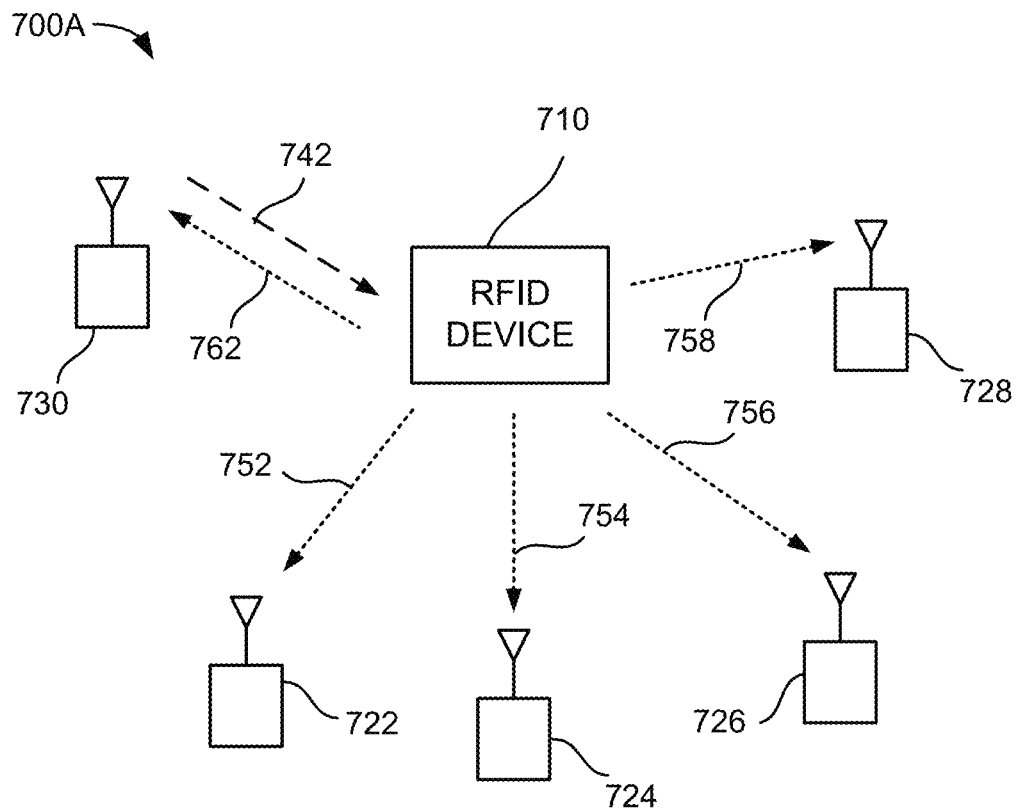
FIG. 7A illustrates an example RFID system for a backscatter-based positioning procedure, according to aspects of the disclosure.

FIG. 7A illustrates an example RFID system 700A for a backscatter-based positioning procedure, according to aspects of the disclosure. The RFID system 700A includes an RFID device 710, and a position of which is to be determined based on the backscatter-based positioning procedure. The RFID system 700A includes one or more receiving RFID stations 722, 724, 726, and 728. The RFID system 700A further includes a transmitting RFID station 730. In some examples, the RFID station 730 may also be configured as a receiving RFID station. In some aspects, the RFID system 700A may include one or more transmitting RFID stations.

In some aspects, the RFID device 710 may be an RFID tag, may include an RFID tag, or may be configured to function as an RFID tag. In some aspect, the RFID device 710 may correspond to the RFID devices described in FIG. 3 or FIG. 5. In some aspects, the RFID stations 722, 724, 726, 728, and 730 may correspond to the RFID stations described in FIG. 3 or FIG. 5. In some aspects, each one of the RFID stations 722, 724, 726, 728, and 730 may be a UE (such as any UE described above) or a TRP (such as any TRP described above) of a wireless communications network.

In some aspects, to perform the backscatter-based positioning procedure, the RFID station 730 may transmit an interrogating signal 742 to the RFID device 710. In some aspects, the interrogating signal 742 may be a positioning reference signal of the wireless communications network, such as DL-PRS, SL-PRS, or SRS. In response to the interrogating signal 742, the RFID device 710 may transmit a backscattered signal by reflecting (also referred to as backscattering in this disclosure) the interrogating signal 742. The backscattered signal may be observed at the RFID stations 722, 724, 726, 728, and 730 and labeled in FIG. 7 as respective received backscattered signals 752, 754, 756, 758, and 762.

In some aspects, the RFID stations 722, 724, 726, 728, and 730 may record the time points the received backscattered signals 752, 754, 756, 758, and 762 arrive. Based on the measured reception time points and the time of transmission of the interrogating signal 742 at the RFID station 730, the combined propagation time of the interrogating signal 742 and the received backscattered signals 752, 754, 756, 758, and 762, denoted as $\tau_1$, $\tau_2$, $\tau_3$, $\tau_4$, and $\tau_0$, may satisfy the following expressions:

$$\tau_1 = \tau_{tx\text{-}TAG} + \tau_{TAG\text{-}rx1},$$

$$\tau_2 = \tau_{tx\text{-}TAG} + \tau_{TAG\text{-}rx2},$$

$$\tau_3 = \tau_{tx\text{-}TAG} + \tau_{TAG\text{-}rx3},$$

$$\tau_4 = \tau_{tx\text{-}TAG} + \tau_{TAG\text{-}rx4},$$

$$\tau_0 = \tau_{tx\text{-}TAG} + \tau_{TAG\text{-}rx0}, \text{ and}$$

$$\tau_{tx\text{-}TAG} = \tau_{TAG\text{-}rx0}.$$

$\tau_{tx\text{-}TAG}$ represents the propagation time from the transmitting RFID station 730 to the RFID device 710. $\tau_{TAG\text{-}rx0}$ represents the propagation time from the RFID device 710 to the transmitting RFID station 730. $\tau_{TAG\text{-}rx1}$ represents the propagation time from the RFID device 710 to the receiving RFID station 722. $\tau_{TAG\text{-}rx2}$ represents the propagation time from the RFID device 710 to the receiving RFID station 724. $\tau_{TAG\text{-}rx3}$ represents the propagation time from the RFID device 710 to the receiving RFID station 726. $\tau_{TAG\text{-}rx4}$ represents the propagation time from the RFID device 710 to the receiving RFID station 728.

In some aspects, based on $\tau_1$, $\tau_2$, $\tau_3$, $\tau_4$, and $\tau_0$, an estimated position of the RFID device 710 may be determined based on a Time-of-Arrival (ToA) positioning method. In some examples, the time-of-arrival values may correspond to the propagation time values from the RFID device 710 to the respective RFID stations 722, 724, 726, 728, and 730 may have the relationship of:

$$\tau_{TAG\text{-}rx0} = \frac{\tau_0}{2}, \tau_{TAG\text{-}rx1} = \tau_1 - \frac{\tau_0}{2}, \tau_{TAG\text{-}rx2} = \tau_2 - \frac{\tau_0}{2}, \tau_{TAG\text{-}rx3} = \tau_3 - \frac{\tau_0}{2}, \tau_{TAG\text{-}rx4} = \tau_4 - \frac{\tau_0}{2}.$$

The estimated ranges between the RFID device 710 and the respective RFID stations 722, 724, 726, 728, and 730 may be calculated by multiplying the time-of-arrival values by the speed of the RF waves (e.g., the speed of light). Moreover, based on the estimated ranges and the position information of the RFID stations 722, 724, 726, 728, and 730, the estimated position of the RFID device may be derived.

In some aspects, based on $\tau_1$, $\tau_2$, $\tau_3$, $\tau_4$, and $\tau_0$, an estimated position of the RFID device 710 may be determined based on a Time Difference of Arrival (TDOA) positioning method. In some examples, the propagation time differences between any two of the RFID stations 722, 724, 726, 728, and 730 may have the expressions of: $\nabla \tau_i$, $_j = \tau_{TAG-rxi} - \tau_{TAG-rxj} = \tau_i - \tau_j$, where i an j represents the corresponding two of the RFID stations 722, 724, 726, 728, and 730. The estimated curves that pass through the RFID device 710 may be determined based on the multiplication of the propagation time differences and the speed of the RF waves (e.g., the speed of light), and the estimated position of the RFID device 710 may be derived based on cross-sections of the estimated curves.

In some aspects, based on to, an estimated range between the RFID device 710 and the RFID station 730 may also be determined based on a Round Trip Time (RTT) positioning method.

FIG. 7A shows a non-limiting example for a backscatter-based positioning procedure having a transmitting RFID station that also functions as a receiving RFID station, together with four other receiving RFID stations. In some examples for performing a particular backscatter-based positioning procedure, the transmitting RFID station may be configured not to function as a receiving RFID station. Also, in some examples for performing a particular backscatter-based positioning procedure, a number of transmitting or receiving RFID stations may be different from the example shown in FIG. 7A.

Figure 7B:
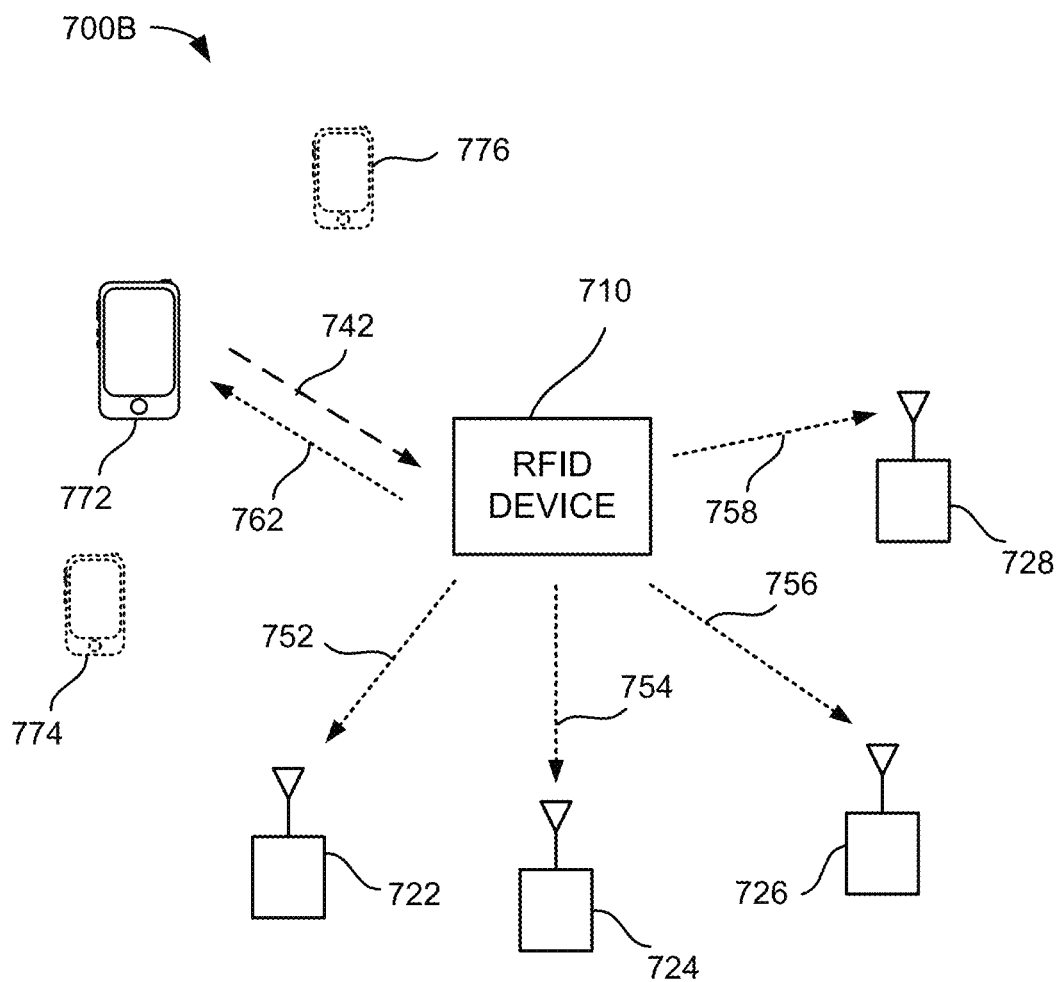
FIG. 7B illustrates another example RFID system for a backscatter-based positioning procedure, according to aspects of the disclosure.

FIG. 7B illustrates another example RFID system 700B for a backscatter-based positioning procedure, according to aspects of the disclosure. The components in FIG. 7B that are the same or similar to those in FIG. 7A are given the same reference numbers, and the detailed descriptions thereof are omitted.

In some aspects, the RFID system 700B may be implemented integrally or in parallel with a wireless communications system, where one or more UEs and TRPs may be configured to function as the one or more receiving RFID stations 722, 724, 726, and 728. In some aspects, the interrogating signal 742 is a positioning reference signal of the wireless communications system.

As shown in FIG. 7B, a UE 772 of the wireless communications system may be configured as the transmitting RFID station for transmitting a positioning reference signal as an interrogating signal for a backscatter-based positioning procedure. In some aspects, the UE 772 may also be configured as a receiving RFID station for receiving the backscattered signal (e.g., the received backscattered signal labeled as 762).

In some aspects, if the RFID device 710 is far away from the transmitting RFID station for transmitting the interrogating signal, the power level of the interrogating signal as observed at the RFID device 710 may be low. As such, the power level of the backscattered signal as observed at the receiving RFID stations may be even lower, and thus the positioning accuracy may be reduced. Therefore, in some aspects, configuring a UE (e.g., the UE 772) that is closest to the RFID device 710 among other available UEs 774 and 776 and/or TRPs of the wireless communications system as the transmitting RFID station for transmitting the interrogating signal may provide a higher power level of the interrogating signal as observed at the RFID device 710, comparing to the case where a far TRP or a far UE is used as the transmitting RFID station for transmitting the interrogating signal. As such, the power level of the backscattered signal as observed at the receiving RFID stations may be higher and thus the positioning accuracy may be improved. For example, the SNR values at the receiving TRPs (as receiving RFID stations) may be expected to be higher, which may consequently lead to more accurate ToA estimates and better RFID device positioning accuracy.

Figure 8:
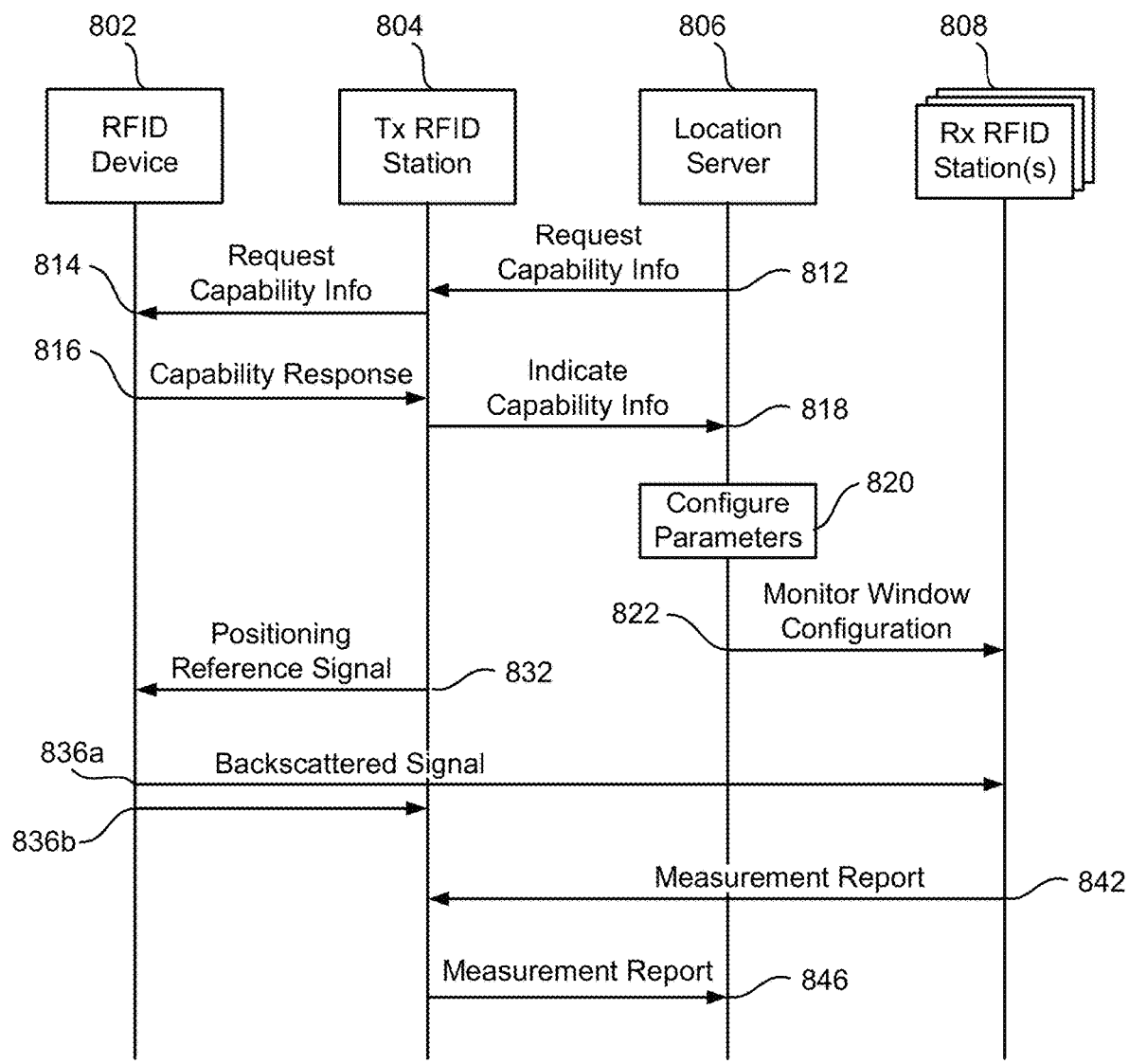
FIG. 8 is a signaling and event diagram illustrating various actions during a backscatter-based positioning procedure, according to aspects of the disclosure.

FIG. 8 is a signaling and event diagram illustrating various actions during a backscatter-based positioning procedure, according to aspects of the disclosure. FIG. 8 illustrates example interactions among an RFID device 802, a transmitting RFID station 804 for transmitting a positioning reference signal as an interrogating signal for the backscatter-based positioning procedure, a location server 806, and one or more receiving RFID stations 808 for receiving a backscattered signal from the RFID device 802. In some aspects, the positioning reference signal may be SL-PRS or SRS.

In some aspects, the RFID device 802 may correspond to the RFID device 710 and may have a configuration corresponding to the RFID device 530 in FIG. 5. In some aspects, the location server 806 may correspond to the location server 172 or the LMF 270 described in this disclosure.

In some aspects, the transmitting RFID station 804 may correspond to the UE (as an RFID station) 772 and may have a configuration corresponding to the RFID station 510 in FIG. 5. In some aspects, the one or more receiving RFID station 808 may correspond to the RFID stations 722, 724, 726, and 728 and may have a configuration corresponding to the RFID station 510 in FIG. 5. In some aspects, the transmitting RFID station 804 may also be configured to perform the operations corresponding to the one or more receiving RFID stations 808.

In some aspects, the transmitting RFID station 804 may be a UE of a wireless communications network, and the one or more receiving RFID stations 808 may be other UEs, TRPs, or a combination thereof, of the wireless communications network.

In some aspects, prior to action 812, the location server 806 may identify that a backscatter-based positioning procedure is to be performed for determining an estimated position of the RFID device 802. Also, prior to action 812, the location server 806 may identify that the backscatter-based positioning procedure is to be performed using a UE as a transmitting RFID station for transmitting the positioning reference signal (also referred to as a UE-assisted positioning).

In some aspects, prior to action 812, the location server 806 may select one UE (e.g., the UE 772) from one or more candidate UEs (e.g., the UEs 772, 774, and 776) as the transmitting RFID station 804 for transmitting the positioning reference signal to the RFID device 802 for the backscatter-based positioning procedure. In some aspects, the selection of the transmitting RFID station 804 may be based on measurements of signals received from the RFID device 802 at different nearby UEs. In some aspects, the position of the UE selected as the transmitting RFID station 804 may be estimated through the UE engaging in a separate positioning session.

In some aspects, the location server 806 may obtain first position information of the one or more candidate UEs (e.g., the UEs 772, 774, and 776) and obtain second position information of the RFID device 802. The location server 806 may select the UE as the transmitting RFID station 804 based on the first position information and the second position information indicating that the UE is closest to the RFID device 802 among the one or more candidate UEs.

In some aspects, the location server 806 may receive previous measurement reports from the one or more candidate UEs (e.g., the UEs 772, 774, and 776), the previous measurement reports being based on a previous backscattered signal from the RFID device 802. The location server 806 may select the UE as the transmitting RFID station 804 based on the previous measurement reports indicating that the UE observes the best signal strength or the best signal quality of the previous backscattered signal among the one or more candidate UEs.

At action 812, the location server 806 transmits a capability inquiry to the transmitting RFID station 804. The capability inquiry requests for capability information of the RFID device 802. At action 814, the transmitting RFID station 804 forwards the capability inquiry to the RFID device 802 in the form of an RFID interrogating signal or via a short-range wireless communication. At action 816, the RFID device 802 responds to the RFID interrogating signal by transmitting an RFID response signal or via the short-range wireless communication, either by backscattering or by active transmission, to the transmitting RFID station 804. In some aspects, the RFID response signal may explicitly provide the capability information of the RFID device 802 in a capability response, or may provide a code that the transmitting RFID station 804 may look up the capability information based on the code. At action 818, the transmitting RFID station 804 transmits the capability information of the RFID device 802 in a capability response back to the location server 806.

In some aspects, the capability information includes a bandwidth supported by the RFID device 802, a group delay report of the RFID device 802, a number of reference signal transmissions supported by the RFID device 802, or a combination thereof.

At action 820, the location server 806 configures various parameters for the backscatter-based positioning procedure based on the capability information of the RFID device 802. In some aspects, the positioning reference signal for the backscatter-based positioning procedure may correspond to an SL-PRS or an SRS of a wireless communications network. In some aspects, the location server 806 may determine a monitor window for observing a backscattered signal from the RFID device 802.

At action 822, the location server 806 transmits a configuration message to the one or more receiving RFID stations 808. In some aspects, the configuration message may indicate at least the configuration of a monitor window for observing a backscattered signal from the RFID device 802 based on the positioning reference signal. In some aspects, the configuration may include an indication of the one or more receiving RFID stations 808 being arranged as receiving RFID stations in the backscatter-based positioning procedure. In some aspects, the transmitting RFID station 804 may be configured as one of the one or more receiving RFID stations 808.

At action 832, the transmitting RFID station 804 transmits the positioning reference signal to the RFID device 802. In some aspects, the positioning reference signal may be encoded with a command specifying a type of response to be provided by the RFID device 802. In some aspects, the positioning reference signal may enable the RFID device 802 to transmit a backscattered signal based on the positioning reference signal.

At action 836a, the RFID device 802 transmits the backscattered signal based on at least a part of the positioning reference signal. At action 836a, the one or more receiving RFID stations 808 receives the backscattered signal based on the specified monitor window. In some aspects, the transmitting RFID station 804 may also be configured as a receiving RFID station, and the transmitting RFID station 804 may receive the backscattered signal based on the specified monitor window at action 836b.

At action 842, the one or more receiving RFID stations 808 transmit one or more corresponding measurement reports to the location server 806. Each measurement report may include a signal strength, a signal quality, a time of arrival, a round trip time, an angle of arrival, or a combination thereof, of the backscattered signal as observed at the reporting receiving RFID station.

At action 846, the transmitting RFID station 804 may also transmit a measurement report of the backscattered signal. In some aspects, the measurement report from the transmitting RFID station 804 may include a signal strength, a signal quality, a time of arrival, a round trip time, an angle of arrival, or a combination thereof, of the backscattered signal. In some aspects, the measurement report from the transmitting RFID station 804 may include a transmission time of the positioning reference signal. In some aspects, the transmitting RFID station 804 may calculate an RTT measurement, and transmit the measurement report including the calculated RTT measurement to the location server 806. In some aspects, action 846 may not be needed and thus may be omitted.

Based on the measurement reports received at action 842 and/or action 846, the location server 806 may determine the estimated position of the RFID device 802 based on the one or more measurement reports. In some aspects, the estimated position of the RFID device 802 may be determined based on the ToA positioning method, the TDOA positioning method, the AoA positioning method, the RTT positioning method, or a combination thereof, associated with the backscattered signal.

Figure 9:
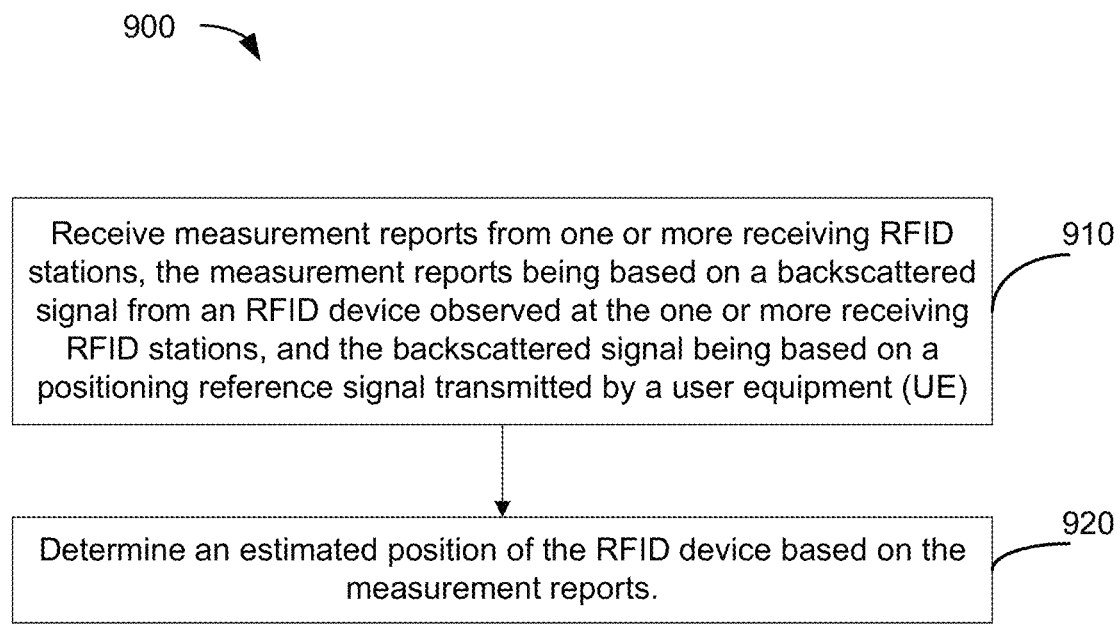
FIG. 9 illustrates an example method of operating a location server, according to aspects of the disclosure.

FIG. 9 illustrates an example method 900 of operating a location server, according to aspects of the disclosure. In an aspect, method 900 may be performed by a location server that may correspond to the location server 806, the location server 172, or the LMF 270 described in this disclosure.

At operation 910, the location server receives measurement reports from one or more receiving RFID stations (e.g., the RFID stations 722, 724, 726, and 728 and in some examples the UE 772 configured as a receiving RFID station, or the one or more receiving RFID stations 808 and in some examples the transmitting RFID station 804 configured as a receiving RFID station), the measurement reports being based on a backscattered signal from an RFID device (e.g., the RFID device 710 or 802) observed at the one or more receiving RFID stations, and the backscattered signal being based on a positioning reference signal transmitted by a UE (e.g., the UE 772 or the UE configured as the transmitting RFID station 804). In some aspects, the positioning reference signal may be an SL-PRS or an SRS.

In an aspect, operation 910 may be performed by the one or more network transceivers 490, the one or more processors 494, memory 496, and/or RFID component 498, any or all of which may be considered means for performing this operation.

In some aspects, the location server may, prior to operation 910, transmit a configuration message to the one or more receiving RFID stations, the configuration message indicating at least a configuration of a monitor window for observing the backscattered signal from the RFID device.

In some aspects, the location server may, prior to operation 910, select, from one or more candidate UEs, the UE as the transmitting RFID station for transmitting the positioning reference signal to the RFID device. In some aspects, for selection of the UE, the location server may obtain first position information of the one or more candidate UEs, obtain second position information of the RFID device, and select the UE as the transmitting RFID station based on the first position information and the second position information indicating that the UE is closest to the RFID device among the one or more candidate UEs. In some aspects, for selection of the UE, the location server may receive previous measurement reports from the one or more candidate UEs, the previous measurement reports being based on a previous backscattered signal from the RFID device. The location server may select the UE as the transmitting RFID station based on the previous measurement reports indicating that the UE observes the best signal strength or the best signal quality of the previous backscattered signal among the one or more candidate UEs.

At operation 920, the location server determines an estimated position of the RFID device based on the measurement reports. In some aspects, the determining the estimated position of the RFID device may be based on ToA, TDOA, AoA, RTT, or a combination thereof, associated with the backscattered signal.

As will be appreciated, a technical advantage of the method 900 is the selection of a UE that is closer to the RFID device than other potential RFID stations as the transmitting RFID station for a backscatter-based positioning procedure, such that the positioning reference signal (as the RFID interrogating signal) transmitted therefrom may have a stronger power level and/or SNR value comparing to that transmitted from a farther TRP. Accordingly, a location server may orchestrate a backscatter-based positioning procedure for determining an estimated position of an RFID device with improved positioning accuracy.

Figure 10:
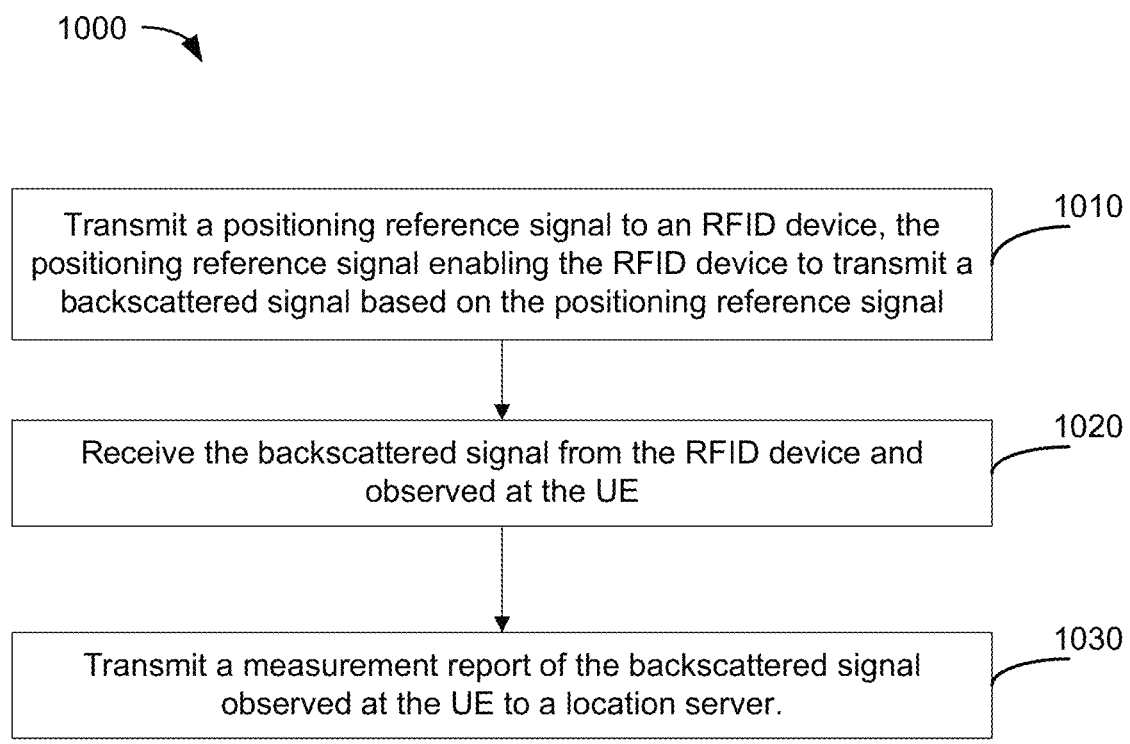
FIG. 10 illustrates an example method of operating a UE, according to aspects of the disclosure.

FIG. 10 illustrates an example method 1000 of operating a UE, according to aspects of the disclosure. In an aspect, method 1000 may be performed by the UE configured as a transmitting RFID station and a receiving RFID station. In some aspects, the method 1000 may be performed by the UE that correspond to any UE or any RFID station described in this disclosure.

At operation 1010, the UE, being configured as a transmitting RFID station for a backscatter-based positioning procedure, transmits a positioning reference signal to an RFID device. The positioning reference signal may enable the RFID device to transmit a backscattered signal based on the positioning reference signal. In some aspects, the positioning reference signal may be an SL-PRS or an SRS. In an aspect, operation 1010 may be performed by the one or more WWAN transceivers 410, the one or more short-range wireless transceivers 420, the one or more processors 432, memory 440, and/or RFID component 442, any or all of which may be considered means for performing this operation.

At operation 1020, the UE, being also configured as a receiving RFID station for the backscatter-based positioning procedure, receives the backscattered signal from the RFID device and observed at the UE. In an aspect, operation 1020 may be performed by the one or more WWAN transceivers 410, the one or more short-range wireless transceivers 420, the one or more processors 432, memory 440, and/or RFID component 442, any or all of which may be considered means for performing this operation.

At operation 1030, the UE transmits a measurement report of the backscattered signal observed at the UE to a location server. In some aspects, the measurement report may include a signal strength, a signal quality, a time of arrival, a round trip time, an angle of arrival, or a combination thereof, of the backscattered signal. In some aspects, the UE may calculate an RTT measurement, and transmit the measurement report including the calculated RTT measurement to the location server. In some aspects, the location server may determine the estimated position of the RFID device based on the measurement report. In an aspect, operation 1030 may be performed by the one or more WWAN transceivers 410, the one or more short-range wireless transceivers 420, the one or more processors 432, memory 440, and/or RFID component 442, any or all of which may be considered means for performing this operation.

In some aspects, prior to operation 1010, the location server may select the UE from one or more candidate UEs as the transmitting RFID station for the backscatter-based positioning procedure. In some aspects, to assist the location server regarding the selection process, the UE may engage in a positioning estimation procedure of the UE to enable the location server to obtain an estimated position of the UE prior to transmission of the positioning reference signal. In some aspects, to assist the location server regarding the selection process prior to transmission of the positioning reference signal, the UE may receive a previous backscattered signal from the RFID device and observed at the UE, and may transmit a previous measurement report to the location server, the previous measurement report indicating a signal strength or a signal quality of the previous backscattered signal observed at the UE.

As will be appreciated, a technical advantage of the method 1000 is the use of a UE as the transmitting RFID station and/or the receiving RFID station for a backscatter-based positioning procedure, such that the positioning reference signal (as the RFID interrogating signal) transmitted therefrom may have a stronger power level and/or SNR comparing to that transmitted from a farther TRP. Accordingly, the UE may be implemented with the functionalities of assisting a backscatter-based positioning procedure for determining an estimated position of an RFID device with improved positioning accuracy.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a location server, the method comprising: receiving measurement reports from one or more receiving RFID stations, the measurement reports being based on a backscattered signal from an RFID device observed at the one or more receiving RFID stations, and the backscattered signal being based on a positioning reference signal transmitted by a user equipment (UE); and determining an estimated position of the RFID device based on the measurement reports.

Clause 2. The method of clause 1, wherein the positioning reference signal is a sidelink positioning reference signal (SL-PRS) or a sounding reference signal (SRS).

Clause 3. The method of any of clauses 1 to 2, further comprising: transmitting a configuration message to the one or more receiving RFID stations, the configuration message indicating at least a configuration of a monitor window for observing the backscattered signal from the RFID device.

Clause 4. The method of any of clauses 1 to 3, further comprising: selecting, from one or more candidate UEs, the UE as a transmitting RFID station for transmitting the positioning reference signal to the RFID device.

Clause 5. The method of clause 4, wherein the selecting the UE comprises: obtaining first position information of the one or more candidate UEs; obtaining second position information of the RFID device; and selecting the UE based on the first position information and the second position information indicating that the UE is closest to the RFID device among the one or more candidate UEs.

Clause 6. The method of clause 4, wherein the selecting the UE comprises: receiving previous measurement reports from the one or more candidate UEs, the previous measurement reports being based on a previous backscattered signal from the RFID device; and selecting the UE based on the previous measurement reports indicating that the UE observes the best signal strength or the best signal quality of the previous backscattered signal among the one or more candidate UEs.

Clause 7. The method of any of clauses 1 to 6, further comprising: transmitting a capability inquiry to the UE, wherein the capability inquiry requests for capability information associated with the RFID device; and receiving a capability response from the UE transmitted in response to the capability inquiry, the capability response indicating the capability information associated with the RFID device.

Clause 8. The method of clause 7, wherein the capability information associated with the RFID device indicates: a bandwidth supported by the RFID device, a group delay report of the RFID device, a number of reference signal transmissions supported by the RFID device, or a combination thereof.

Clause 9. The method of any of clauses 1 to 8, wherein the determining the estimated position of the RFID device is based on time of arrival (ToA), time difference of arrival (TDOA), angle of arrival (AoA), round trip time (RTT), or a combination thereof, associated with the backscattered signal.

Clause 10. The method of any of clauses 1 to 9, wherein the one or more receiving RFID stations include the UE and at least one other receiving RFID station.

Clause 11. The method of clause 10, wherein the one or more receiving RFID stations include a transmission/reception point (TRP), another UE, or a combination thereof, of a wireless communication network.

Clause 12. A method of operating a user equipment (UE), the method comprising: transmitting a positioning reference signal to a radio frequency identification (RFID) device, the positioning reference signal enabling the RFID device to transmit a backscattered signal based on the positioning reference signal; receiving the backscattered signal from the RFID device and observed at the UE; and transmitting a measurement report of the backscattered signal observed at the UE to a location server.

Clause 13. The method of clause 12, wherein the positioning reference signal is a sidelink positioning reference signal (SL-PRS) or a sounding reference signal (SRS).

Clause 14. The method of any of clauses 12 to 13, further comprising: engaging in a positioning estimation procedure of the UE to enable the location server to obtain an estimated position of the UE prior to transmission of the positioning reference signal.

Clause 15. The method of any of clauses 12 to 14, further comprising, prior to transmission of the positioning reference signal; receiving a previous backscattered signal from the RFID device and observed at the UE; and transmitting a previous measurement report to the location server, the previous measurement report indicating a signal strength or a signal quality of the previous backscattered signal observed at the UE.

Clause 16. The method of any of clauses 12 to 15, further comprising: receiving a capability inquiry from the location server, wherein the capability inquiry requests for capability information associated with the RFID device; and transmitting a capability response to the location server in response to the capability inquiry, the capability response indicating the capability information associated with the RFID device.

Clause 17. The method of clause 16, wherein the capability information associated with the RFID device indicates: a bandwidth supported by the RFID device, a group delay report of the RFID device, a number of reference signal transmissions supported by the RFID device, or a combination thereof.

Clause 18. A location server, comprising: a memory; at least one transceiver; and at least one processor communicatively coupled to the memory and the at least one transceiver, the at least one processor configured to: receive, via the at least one transceiver, measurement reports from one or more receiving RFID stations, the measurement reports being based on a backscattered signal from an RFID device observed at the one or more receiving RFID stations, and the backscattered signal being based on a positioning reference signal transmitted by a user equipment (UE); and determine an estimated position of the RFID device based on the measurement reports.

Clause 19. The location server of clause 18, wherein the positioning reference signal is a sidelink positioning reference signal (SL-PRS) or a sounding reference signal (SRS).

Clause 20. The location server of any of clauses 18 to 19, wherein the at least one processor is further configured to: transmit, via the at least one transceiver, a configuration message to the one or more receiving RFID stations, the configuration message indicating at least a configuration of a monitor window for observing the backscattered signal from the RFID device.

Clause 21. The location server of any of clauses 18 to 20, wherein the at least one processor is further configured to: select, from one or more candidate UEs, the UE as a transmitting RFID station for transmitting the positioning reference signal to the RFID device.

Clause 22. The location server of clause 21, wherein the at least one processor configured to select the UE comprises the at least one processor configured to: obtain first position information of the one or more candidate UEs; obtain second position information of the RFID device; and select the UE based on the first position information and the second position information indicating that the UE is closest to the RFID device among the one or more candidate UEs.

Clause 23. The location server of clause 21, wherein the at least one processor configured to select the UE comprises the at least one processor configured to: receive, via the at least one transceiver, previous measurement reports from the one or more candidate UEs, the previous measurement reports being based on a previous backscattered signal from the RFID device; and select the UE based on the previous measurement reports indicating that the UE observes the best signal strength or the best signal quality of the previous backscattered signal among the one or more candidate UEs.

Clause 24. The location server of any of clauses 18 to 23, wherein the at least one processor is further configured to: transmit, via the at least one transceiver, a capability inquiry to the UE, wherein the capability inquiry requests for capability information associated with the RFID device; and receive, via the at least one transceiver, a capability response from the UE transmitted in response to the capability inquiry, the capability response indicating the capability information associated with the RFID device.

Clause 25. The location server of clause 24, wherein the capability information associated with the RFID device indicates; a bandwidth supported by the RFID device, a group delay report of the RFID device, a number of reference signal transmissions supported by the RFID device, or a combination thereof.

Clause 26. The location server of any of clauses 18 to 25, wherein the estimated position of the RFID device is determined based on time of arrival (ToA), time difference of arrival (TDOA), angle of arrival (AoA), round trip time (RTT), or a combination thereof, associated with the backscattered signal.

Clause 27. The location server of any of clauses 18 to 26, wherein the one or more receiving RFID stations include the UE and at least one other receiving RFID station.

Clause 28. The location server of clause 27, wherein the one or more receiving RFID stations include a transmission/reception point (TRP), another UE, or a combination thereof, of a wireless communication network.

Clause 29. A user equipment (UE), comprising: a memory; at least one transceiver; and at least one processor communicatively coupled to the memory and the at least one transceiver, the at least one processor configured to: transmit, via the at least one transceiver, a positioning reference signal to a radio frequency identification (RFID) device, the positioning reference signal enabling the RFID device to transmit a backscattered signal based on the positioning reference signal; receive, via the at least one transceiver, the backscattered signal from the RFID device and observed at the UE; and transmit, via the at least one transceiver, a measurement report of the backscattered signal observed at the UE to a location server.

Clause 30. The UE of clause 29, wherein the positioning reference signal is a sidelink positioning reference signal (SL-PRS) or a sounding reference signal (SRS).

Clause 31. The UE of any of clauses 29 to 30, wherein the at least one processor is further configured to: engage in a positioning estimation procedure of the UE to enable the location server to obtain an estimated position of the UE prior to transmission of the positioning reference signal.

Clause 32. The UE of any of clauses 29 to 31, wherein the at least one processor is further configured to, prior to transmission of the positioning reference signal; receive, via the at least one transceiver, a previous backscattered signal from the RFID device and observed at the UE; and transmit, via the at least one transceiver, a previous measurement report to the location server, the previous measurement report indicating a signal strength or a signal quality of the previous backscattered signal observed at the UE.

Clause 33. The UE of any of clauses 29 to 32, wherein the at least one processor is further configured to: receive, via the at least one transceiver, a capability inquiry from the location server, wherein the capability inquiry requests for capability information associated with the RFID device; and transmit, via the at least one transceiver, a capability response to the location server in response to the capability inquiry, the capability response indicating the capability information associated with the RFID device.

Clause 34. The UE of clause 33, wherein the capability information associated with the RFID device indicates: a bandwidth supported by the RFID device, a group delay report of the RFID device, a number of reference signal transmissions supported by the RFID device, or a combination thereof.

Clause 35. A location server, comprising: means for receiving measurement reports from one or more receiving RFID stations, the measurement reports being based on a backscattered signal from an RFID device observed at the one or more receiving RFID stations, and the backscattered signal being based on a positioning reference signal transmitted by a user equipment (UE); and means for determining an estimated position of the RFID device based on the measurement reports.

Clause 36. The location server of clause 35, wherein the positioning reference signal is a sidelink positioning reference signal (SL-PRS) or a sounding reference signal (SRS).

Clause 37. The location server of any of clauses 35 to 36, further comprising: means for transmitting a configuration message to the one or more receiving RFID stations, the configuration message indicating at least a configuration of a monitor window for observing the backscattered signal from the RFID device.

Clause 38. The location server of any of clauses 35 to 37, further comprising: means for selecting, from one or more candidate UEs, the UE as a transmitting RFID station for transmitting the positioning reference signal to the RFID device.

Clause 39. The location server of clause 38, wherein the means for selecting the UE comprises: means for obtaining first position information of the one or more candidate UEs; means for obtaining second position information of the RFID device; and means for selecting the UE based on the first position information and the second position information indicating that the UE is closest to the RFID device among the one or more candidate UEs.

Clause 40. The location server of clause 38, wherein the means for selecting the UE comprises: means for receiving previous measurement reports from the one or more candidate UEs, the previous measurement reports being based on a previous backscattered signal from the RFID device; and means for selecting the UE based on the previous measurement reports indicating that the UE observes the best signal strength or the best signal quality of the previous backscattered signal among the one or more candidate UEs.

Clause 41. The location server of any of clauses 35 to 40, further comprising: means for transmitting a capability inquiry to the UE, wherein the capability inquiry requests for capability information associated with the RFID device; and means for receiving a capability response from the UE transmitted in response to the capability inquiry, the capability response indicating the capability information associated with the RFID device.

Clause 42. The location server of clause 41, wherein the capability information associated with the RFID device indicates: a bandwidth supported by the RFID device, a group delay report of the RFID device, a number of reference signal transmissions supported by the RFID device, or a combination thereof.

Clause 43. The location server of any of clauses 35 to 42, wherein the estimated position of the RFID device is determined based on time of arrival (ToA), time difference of arrival (TDOA), angle of arrival (AA), round trip time (RTT), or a combination thereof, associated with the backscattered signal.

Clause 44. The location server of any of clauses 35 to 43, wherein the one or more receiving RFID stations include the UE and at least one other receiving RFID station.

Clause 45. The location server of clause 44, wherein the one or more receiving RFID stations include a transmission/reception point (TRP), another UE, or a combination thereof, of a wireless communication network.

Clause 46. A user equipment (UE), comprising: means for transmitting a positioning reference signal to a radio frequency identification (RFID) device, the positioning reference signal enabling the RFID device to transmit a backscattered signal based on the positioning reference signal; means for receiving the backscattered signal from the RFID device and observed at the UE; and means for transmitting a measurement report of the backscattered signal observed at the UE to a location server.

Clause 47. The UE of clause 46, wherein the positioning reference signal is a sidelink positioning reference signal (SL-PRS) or a sounding reference signal (SRS).

Clause 48. The UE of any of clauses 46 to 47, further comprising: means for engaging in a positioning estimation procedure of the UE to enable the location server to obtain an estimated position of the UE prior to transmission of the positioning reference signal.

Clause 49. The UE of any of clauses 46 to 48, further comprising, prior to transmission of the positioning reference signal; means for receiving a previous backscattered signal from the RFID device and observed at the UE; and means for transmitting a previous measurement report to the location server, the previous measurement report indicating a signal strength or a signal quality of the previous backscattered signal observed at the UE.

Clause 50. The UE of any of clauses 46 to 49, further comprising: means for receiving a capability inquiry from the location server, wherein the capability inquiry requests for capability information associated with the RFID device; and means for transmitting a capability response to the location server in response to the capability inquiry, the capability response indicating the capability information associated with the RFID device.

Clause 51. The UE of clause 50, wherein the capability information associated with the RFID device indicates: a bandwidth supported by the RFID device, a group delay report of the RFID device, a number of reference signal transmissions supported by the RFID device, or a combination thereof.

Clause 52. A non-transitory computer-readable medium storing computer-executable instructions that, when executed by a location server, cause the location server to: receive measurement reports from one or more receiving RFID stations, the measurement reports being based on a backscattered signal from an RFID device observed at the one or more receiving RFID stations, and the backscattered signal being based on a positioning reference signal transmitted by a user equipment (UE); and determine an estimated position of the RFID device based on the measurement reports.

Clause 53. The non-transitory computer-readable medium of clause 52, wherein the positioning reference signal is a sidelink positioning reference signal (SL-PRS) or a sounding reference signal (SRS).

Clause 54. The non-transitory computer-readable medium of any of clauses 52 to 53, further comprising computer-executable instructions that, when executed by the location server, cause the location server to: transmit a configuration message to the one or more receiving RFID stations, the configuration message indicating at least a configuration of a monitor window for observing the backscattered signal from the RFID device.

Clause 55. The non-transitory computer-readable medium of any of clauses 52 to 54, further comprising computer-executable instructions that, when executed by the location server, cause the location server to: select, from one or more candidate UEs, the UE as a transmitting RFID station for transmitting the positioning reference signal to the RFID device.

Clause 56. The non-transitory computer-readable medium of clause 55, wherein the instructions that cause the location server to select the UE comprises instructions that cause the location server to: obtain first position information of the one or more candidate UEs; obtain second position information of the RFID device; and select the UE based on the first position information and the second position information indicating that the UE is closest to the RFID device among the one or more candidate UEs.

Clause 57. The non-transitory computer-readable medium of clause 55, wherein the instructions that cause the location server to select the UE comprises instructions that cause the location server to: receive previous measurement reports from the one or more candidate UEs, the previous measurement reports being based on a previous backscattered signal from the RFID device; and select the UE based on the previous measurement reports indicating that the UE observes the best signal strength or the best signal quality of the previous backscattered signal among the one or more candidate UEs.

Clause 58. The non-transitory computer-readable medium of any of clauses 52 to 57, further comprising computer-executable instructions that, when executed by the location server, cause the location server to: transmit a capability inquiry to the UE, wherein the capability inquiry requests for capability information associated with the RFID device; and receive a capability response from the UE transmitted in response to the capability inquiry, the capability response indicating the capability information associated with the RFID device.

Clause 59. The non-transitory computer-readable medium of clause 58, wherein the capability information associated with the RFID device indicates: a bandwidth supported by the RFID device, a group delay report of the RFID device, a number of reference signal transmissions supported by the RFID device, or a combination thereof.

Clause 60. The non-transitory computer-readable medium of any of clauses 52 to 59, wherein the estimated position of the RFID device is determined based on time of arrival (ToA), time difference of arrival (TDOA), angle of arrival (AoA), round trip time (RTT), or a combination thereof, associated with the backscattered signal.

Clause 61. The non-transitory computer-readable medium of any of clauses 52 to 60, wherein the one or more receiving RFID stations include the UE and at least one other receiving RFID station.

Clause 62. The non-transitory computer-readable medium of clause 61, wherein the one or more receiving RFID stations include a transmission/reception point (TRP), another UE, or a combination thereof, of a wireless communication network.

Clause 63. A non-transitory computer-readable medium storing computer-executable instructions that, when executed by a user equipment (UE), cause the UE to: transmit a positioning reference signal to a radio frequency identification (RFID) device, the positioning reference signal enabling the RFID device to transmit a backscattered signal based on the positioning reference signal; receive the backscattered signal from the RFID device and observed at the UE; and transmit a measurement report of the backscattered signal observed at the UE to a location server.

Clause 64. The non-transitory computer-readable medium of clause 63, wherein the positioning reference signal is a sidelink positioning reference signal (SL-PRS) or a sounding reference signal (SRS).

Clause 65. The non-transitory computer-readable medium of any of clauses 63 to 64, further comprising computer-executable instructions that, when executed by the UE, cause the UE to: engage in a positioning estimation procedure of the UE to enable the location server to obtain an estimated position of the UE prior to transmission of the positioning reference signal.

Clause 66. The non-transitory computer-readable medium of any of clauses 63 to 65, further comprising computer-executable instructions that, when executed by the UE, cause the UE to, prior to transmission of the positioning reference signal; receive a previous backscattered signal from the RFID device and observed at the UE; and transmit a previous measurement report to the location server, the previous measurement report indicating a signal strength or a signal quality of the previous backscattered signal observed at the UE.

Clause 67. The non-transitory computer-readable medium of any of clauses 63 to 66, further comprising computer-executable instructions that, when executed by the UE, cause the UE to: receive a capability inquiry from the location server, wherein the capability inquiry requests for capability information associated with the RFID device; and transmit a capability response to the location server in response to the capability inquiry, the capability response indicating the capability information associated with the RFID device.

Clause 68. The non-transitory computer-readable medium of clause 67, wherein the capability information associated with the RFID device indicates: a bandwidth supported by the RFID device, a group delay report of the RFID device, a number of reference signal transmissions supported by the RFID device, or a combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a location server, the method comprising:
    transmitting a capability inquiry to a user equipment (UE), wherein the capability inquiry requests capability information associated with a radio frequency identification (RFID) device;
    receiving a capability response from the UE, the capability response indicating the capability information associated with the RFID device;
    receiving measurement reports from one or more receiving RFID stations, the measurement reports being based on a backscattered signal from the RFID device observed at the one or more receiving RFID stations, and the backscattered signal being based on a positioning reference signal transmitted by the UE; and
    determining an estimated position of the RFID device based on the measurement reports.

2. The method of claim 1, wherein the positioning reference signal is a sidelink positioning reference signal (SL-PRS) or a sounding reference signal (SRS).

3. The method of claim 1, further comprising:
    transmitting a configuration message to the one or more receiving RFID stations, the configuration message indicating at least a configuration of a monitor window for observing the backscattered signal from the RFID device.

4. The method of claim 1, further comprising:
    selecting, from one or more candidate UEs, the UE as a transmitting RFID station for transmitting the positioning reference signal to the RFID device.

5. The method of claim 4, wherein the selecting the UE comprises:
    obtaining first position information of the one or more candidate UEs;
    obtaining second position information of the RFID device; and
    selecting the UE based on the first position information and the second position information indicating that the UE is closest to the RFID device among the one or more candidate UEs.

6. The method of claim 4, wherein the selecting the UE comprises:
    receiving previous measurement reports from the one or more candidate UEs, the previous measurement reports being based on a previous backscattered signal from the RFID device; and
    selecting the UE based on the previous measurement reports indicating that the UE observes the best signal strength or the best signal quality of the previous backscattered signal among the one or more candidate UEs.

7. The method of claim 1, wherein the capability information associated with the RFID device indicates:
    a bandwidth supported by the RFID device,
    a group delay report of the RFID device,
    a number of reference signal transmissions supported by the RFID device, or
    a combination thereof.

8. The method of claim 1, wherein the determining the estimated position of the RFID device is based on time of arrival (ToA), time difference of arrival (TDOA), angle of arrival (AoA), round trip time (RTT), or a combination thereof, associated with the backscattered signal.

9. The method of claim 1, wherein the one or more receiving RFID stations include the UE and at least one other receiving RFID station.

10. The method of claim 9, wherein the one or more receiving RFID stations include a transmission/reception point (TRP), another UE, or a combination thereof, of a wireless communication network.

11. A method of operating a user equipment (UE), the method comprising:
    receiving a capability inquiry from a location server, wherein the capability inquiry requests capability information associated with a radio frequency identification (RFID) device;
    transmitting a capability response to the location server, the capability response indicating the capability information associated with the RFID device;
    transmitting a positioning reference signal to a radio frequency identification (RFID) device, the positioning reference signal enabling the RFID device to transmit a backscattered signal based on the positioning reference signal;
    receiving the backscattered signal from the RFID device and observed at the UE; and
    transmitting a measurement report of the backscattered signal observed at the UE to a location server.

12. The method of claim 11, wherein the positioning reference signal is a sidelink positioning reference signal (SL-PRS) or a sounding reference signal (SRS).

13. The method of claim 11, further comprising:
    engaging in a positioning estimation procedure of the UE to enable the location server to obtain an estimated position of the UE prior to transmission of the positioning reference signal.

14. The method of claim 11, further comprising, prior to transmission of the positioning reference signal:
    receiving a previous backscattered signal from the RFID device and observed at the UE; and
    transmitting a previous measurement report to the location server, the previous measurement report indicating a signal strength or a signal quality of the previous backscattered signal observed at the UE.

15. The method of claim 11, wherein the capability information associated with the RFID device indicates:
    a bandwidth supported by the RFID device,
    a group delay report of the RFID device, a number of reference signal transmissions supported by the RFID device, or a combination thereof.

16. A location server, comprising:

a memory;

at least one transceiver; and at least one processor communicatively coupled to the memory and the at least one transceiver, the at least one processor configured to:

transmit, via the at least one transceiver, a capability inquiry to a user equipment (UE), wherein the capability inquiry requests capability information associated with a radio frequency identification (RFID) device;

receive a capability response from the UE, the capability response indicating the capability information associated with the RFID device;

receive, via the at least one transceiver, measurement reports from one or more receiving RFID stations, the measurement reports being based on a backscattered signal from the RFID device observed at the one or more receiving RFID stations, and the backscattered signal being based on a positioning reference signal transmitted by the UE; and determine an estimated position of the RFID device based on the measurement reports.

17. The location server of claim 16, wherein the positioning reference signal is a sidelink positioning reference signal (SL-PRS) or a sounding reference signal (SRS).

18. The location server of claim 16, wherein the at least one processor is further configured to:

transmit, via the at least one transceiver, a configuration message to the one or more receiving RFID stations, the configuration message indicating at least a configuration of a monitor window for observing the backscattered signal from the RFID device.

19. The location server of claim 16, wherein the at least one processor is further configured to:

obtain first position information of one or more candidate UEs;

obtain second position information of the RFID device; and select, from one or more candidate UEs, the UE based on the first position information and the second position information indicating that the UE is closest to the RFID device among the one or more candidate UEs.

20. The location server of claim 16, wherein the at least one processor is further configured to:

receive, via the at least one transceiver, previous measurement reports from one or more candidate UEs, the previous measurement reports being based on a previous backscattered signal from the RFID device; and select, from one or more candidate UEs, the UE based on the previous measurement reports indicating that the UE observes the best signal strength or the best signal quality of the previous backscattered signal among the one or more candidate UEs.

21. The location server of claim 16, wherein the capability information associated with the RFID device indicates:

a bandwidth supported by the RFID device, a group delay report of the RFID device, a number of reference signal transmissions supported by the RFID device, or a combination thereof.

22. The location server of claim 16, wherein the estimated position of the RFID device is determined based on time of arrival (ToA), time difference of arrival (TDOA), angle of arrival (AoA), round trip time (RTT), or a combination thereof, associated with the backscattered signal.

23. A user equipment (UE), comprising:

a memory;

at least one transceiver; and at least one processor communicatively coupled to the memory and the at least one transceiver, the at least one processor configured to:

receive a capability inquiry from a location server, wherein the capability inquiry requests capability information associated with a radio frequency identification (RFID) device;

transmit a capability response to the location server, the capability response indicating the capability information associated with the RFID device;

transmit, via the at least one transceiver, a positioning reference signal to a radio frequency identification (RFID) device, the positioning reference signal enabling the RFID device to transmit a backscattered signal based on the positioning reference signal;

receive, via the at least one transceiver, the backscattered signal from the RFID device and observed at the UE; and transmit, via the at least one transceiver, a measurement report of the backscattered signal observed at the UE to a location server.

24. The UE of claim 23, wherein the positioning reference signal is a sidelink positioning reference signal (SL-PRS) or a sounding reference signal (SRS).

25. The UE of claim 23, wherein the at least one processor is further configured to:

engage in a positioning estimation procedure of the UE to enable the location server to obtain an estimated position of the UE prior to transmission of the positioning reference signal.

26. The UE of claim 23, wherein the at least one processor is further configured to, prior to transmission of the positioning reference signal:

receive, via the at least one transceiver, a previous backscattered signal from the RFID device and observed at the UE; and transmit, via the at least one transceiver, a previous measurement report to the location server, the previous measurement report indicating a signal strength or a signal quality of the previous backscattered signal observed at the UE.

27. The UE of claim 23, wherein the capability information associated with the RFID device indicates:

a bandwidth supported by the RFID device, a group delay report of the RFID device, a number of reference signal transmissions supported by the RFID device, or a combination thereof.

* * * * *